US012639408B2

(12) United States Patent
Li et al.

(10) Patent No.: US 12,639,408 B2
(45) Date of Patent: May 26, 2026

(54) PERSONAL IDENTIFICATION NUMBER PIN PROCESSING METHOD AND APPARATUS

(71) Applicant: Huawei Technologies Co., Ltd., Shenzhen (CN)

(72) Inventors: Yuanfeng Li, Shenzhen (CN); Fengguang Qiu, Shenzhen (CN); Shaojun Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 18/578,885

(22) PCT Filed: Jul. 8, 2022

(86) PCT No.: PCT/CN2022/104512
§ 371 (c)(1),
(2) Date: Jun. 28, 2024

(87) PCT Pub. No.: WO2023/284633
PCT Pub. Date: Jan. 19, 2023

(65) Prior Publication Data
US 2024/0338428 A1 Oct. 10, 2024

(30) Foreign Application Priority Data
Jul. 15, 2021 (CN) .......................... 202110801949.1

(51) Int. Cl.
*G06F 21/31* (2013.01)

(52) U.S. Cl.
CPC .................................. *G06F 21/31* (2013.01)

(58) Field of Classification Search
CPC ....... H04W 12/40; H04W 12/69; H04W 8/18; H04W 12/06; H04W 12/08; G06F 21/31; H04L 63/083
See application file for complete search history.

(56) References Cited

U.S. PATENT DOCUMENTS 6,138,005 A    10/2000 Park
6,850,777 B1 *   2/2005 Estes ..................... H04L 63/083
                                                      455/411
8,200,192 B2 *   6/2012 Hsu ..................... H04W 12/069
                                                      455/10
(Continued)

FOREIGN PATENT DOCUMENTS

CN        103002431 A       3/2013
CN        105790949 A       7/2016
(Continued)

*Primary Examiner* — Hosuk Song
(74) *Attorney, Agent, or Firm* — Slater Matsil, LLP

(57) ABSTRACT

In accordance with an embodiment, a method for verifying a personal identification number (PIN) code includes: receiving a first PIN code entered by the user, and storing the first PIN code to complete enabling the function of automatically verifying the PIN code of a first subscriber identity module (SIM) card, wherein the first PIN code is used by a terminal device to automatically verify the first SIM card; and verifying automatically the PIN code of the first SIM card in response to the first SIM card being inserted into the terminal device while the terminal device is powered-on or in response to the terminal device into which the first SIM card is inserted being powered-on.

20 Claims, 14 Drawing Sheets

(56) References Cited

U.S. PATENT DOCUMENTS

| | | | |
|---|---|---|---|
| 8,375,454 B2 * | 2/2013 | Sun | G06F 21/125 |
| | | | 726/16 |
| 9,247,425 B2 * | 1/2016 | Nousiainen | H04W 12/068 |
| 9,414,281 B2 * | 8/2016 | Liu | H04W 36/22 |
| 10,700,976 B2 * | 6/2020 | Richards | H04W 12/12 |
| 11,863,681 B2 * | 1/2024 | Fukuda | H04L 9/3226 |
| 2021/0281415 A1 * | 9/2021 | Fukuda | H04L 9/3263 |

FOREIGN PATENT DOCUMENTS

| | | | |
|---|---|---|---|
| CN | 106686573 A | 5/2017 | |
| CN | 110691352 A | 1/2020 | |
| CN | 112969182 A | 6/2021 | |

* cited by examiner

PERSONAL IDENTIFICATION NUMBER PIN PROCESSING METHOD AND APPARATUS

CROSS-REFERENCE TO RELATED APPLICATIONS

This application is a National Stage of International Application No. PCT/CN2022/104512, filed on Jul. 8, 2022, which claims priority to Chinese Patent Application No. 202110801949.1, filed on Jul. 15, 2021, both of which are hereby incorporated by reference in their entireties.

TECHNICAL FIELD

Embodiments of this application relate to communication technologies, and in particular, to a personal identification number PIN processing method and apparatus.

BACKGROUND

A subscriber identification module (subscriber identification module, SIM) card is an important asset of a user. The SIM card is associated with a mobile phone number of the user. The user usually uses the mobile phone number to register for and log in to applications. Loss of the SIM card seriously threatens privacy and property security of the user.

Enabling a personal identification number (personal identification number, PIN) verification function of the SIM card is an effective manner to protect the SIM card. However, currently, when the user enables the PIN verification function of the SIM card, a corresponding PIN enabling option needs to be found on a setting page of a terminal device. Consequently, efficiency is low.

SUMMARY

Embodiments of this application provide a personal identification number PIN processing method and apparatus, to improve efficiency of enabling a PIN verification function of a SIM card by a user.

According to a first aspect, an embodiment of this application provides a PIN processing method. The method may be performed by a terminal device or a chip in a terminal device. The following uses an example in which the method is performed by the terminal device for description. The method includes: In response to detecting that a terminal device is powered on or a first subscriber identification module SIM card is inserted into a powered-on terminal device, the terminal device detects whether a PIN verification function of the first SIM card in the terminal device is enabled.

In a possible implementation, a manner in which the terminal device detects whether the PIN verification function of the first SIM card is enabled may be as follows: The terminal device sends a request command to the first SIM card, where the request command is used to request information about the first SIM card. In response to the request command, the first SIM card may feed back the information about the first SIM card to the terminal device, where the information indicates a status of the PIN verification function of the first SIM card, and the status includes on or off. In this way, the terminal device may obtain, based on the information about the first SIM card, whether the PIN verification function of the first SIM card is enabled.

The terminal device outputs first prompt information in response to that the PIN verification function of the first SIM card is not enabled and the terminal device does not output the first prompt information, where the first prompt information is used to guide a user to enable the PIN verification function of the first SIM card. The terminal device may not output the first prompt information in response to that the PIN verification function of the first SIM card is enabled.

In embodiments of this application, the terminal device may guide the user to enable the PIN verification function of the first SIM card, and efficiency is high.

In a possible implementation, a manner in which the terminal device detects whether the terminal device outputs the first prompt information may be as follows: In a process in which the user historically operates the terminal device, in response to detecting that the terminal device outputs the first prompt information, the terminal device may store an output record of outputting the first prompt information by the terminal device. The terminal device queries whether the terminal device stores the output record. If the terminal device stores the output record, it is determined that the terminal device outputs the first prompt information. If the terminal device does not store the output record, it is determined that the terminal device does not output the first prompt information.

In a possible implementation, in response to detecting that the terminal device is powered on or the first subscriber identification module SIM card is inserted into the powered-on terminal device, the terminal device detects whether the PIN verification function of the first SIM card in the terminal device is enabled. The terminal device may further detect at least one of the following: whether usage duration of the terminal device is greater than or equal to first preset duration, whether the user operates a PIN setting interface, or whether the terminal device enables a preset security function.

The following is described by using examples in which detection conditions of "whether the usage duration of the terminal device is greater than or equal to the first preset duration", "whether the user operates the PIN setting interface", and "whether the terminal device enables the preset security function" are sequentially added based on "in response to detecting that the terminal device is powered on or the first subscriber identification module SIM card is inserted into the powered-on terminal device, the terminal device detects whether the PIN verification function of the first SIM card in the terminal device is enabled".

In a first manner, the terminal device may record a first moment in response to detecting that a SIM card is inserted into the terminal device for the first time. The terminal device may use a difference between a current moment and the first moment as the usage duration in response to that the PIN verification function of the first SIM card is not enabled and the terminal device does not output the first prompt information. If the usage duration of the terminal device is greater than or equal to the first preset duration, the terminal device outputs the first prompt information.

In this manner, the user can effectively obtain the first prompt information, and a success rate of enabling the PIN verification function by the user increases.

In a second manner, in the process in which the user historically operates the terminal device, in response to detecting that the user operates the PIN setting interface, the terminal device stores an operation record of operating the PIN setting interface by the user.

In response to that the PIN verification function of the first SIM card is not enabled, the terminal device does not output the first prompt information, and the usage duration of the terminal device is greater than or equal to the first preset duration, the terminal device queries whether the terminal device stores the operation record. If the terminal device does not store the operation record, the terminal device determines that the user does not operate the PIN setting interface, and outputs the first prompt information.

It should be understood that, if the terminal device stores the operation record, the terminal device may determine that the user operates the PIN setting interface, and may determine that the user knows the PIN, and may not output the first prompt information.

In this manner, if the user operates the PIN setting interface, the terminal device may determine that the user knows the PIN, and does not need to prompt the user to enable the PIN verification function of the SIM card, to avoid troubles caused to the user by a plurality of prompts.

In a third manner, in response to that the PIN verification function of the first SIM card is not enabled, the terminal device does not the first prompt information, the usage duration of the terminal device is greater than or equal to the first preset duration, and the user does not operate the PIN setting interface, the terminal device may detect whether the terminal device enables the preset security function. In an embodiment, the preset security function includes at least one of the following: a function of finding a mobile phone and a function of a secure payment center.

If the terminal device enables the preset security function, the terminal device may determine that the user who uses the terminal device has high security awareness, and the success rate of enabling the PIN verification function of the SIM card by the user is high. In embodiments of this application, the terminal device may output the first prompt information in response to that the PIN verification function of the first SIM card is not enabled, the terminal device does not output the first prompt information, the usage duration of the terminal device is greater than or equal to the first preset duration, the user does not operate the PIN setting interface, and the terminal device enables the preset security function. Therefore, this can improve the success rate of enabling the PIN verification function of the SIM card by the user.

In a possible implementation, that the terminal device outputs first prompt information may be as follows: The terminal device displays a notification box including the first prompt information. In this implementation, the terminal device displays a PIN-related interface in response to detecting that the user operates the notification box, where the PIN-related interface includes information about a PIN.

The PIN-related interface may automatically jump to the PIN setting interface. For example, the terminal device displays the PIN setting interface in response to that duration of displaying the PIN-related interface reaches second preset duration. Alternatively, the PIN-related interface includes a PIN setting control. The terminal device displays the PIN setting interface in response to that the user operates the PIN setting control.

The following describes the PIN setting interface and a process in which the user operates the PIN setting interface.

In a first manner, the PIN setting interface includes an option for enabling SIM card protection, and the option for enabling SIM card protection includes a first control. In response to that the user turns on the first control, the terminal device displays an interface for enabling a PIN verification function, where the interface for enabling a PIN verification function prompts the user to enter the PIN of the first SIM card.

In response to that the user enters a first PIN on the interface for enabling a PIN verification function, the terminal device verifies the first PIN based on the PIN of the first SIM card. The PIN verification function of the first SIM card is enabled in response to that verification of the first PIN succeeds.

In this manner, when the user enables the PIN verification function of the first SIM card, the user needs to enter the PIN of the first SIM card, to prevent another user from randomly enabling the PIN verification function of the first SIM card.

It should be understood that a manner in which the terminal device verifies the first PIN may be as follows: The first SIM card stores the PIN of the first SIM card, the terminal device may send the first PIN to the first SIM card, and the first SIM card compares the stored PIN of the first SIM card with the first PIN. If the PIN of the first SIM card is the same as the first PIN, verification of the first PIN succeeds. If the PIN of the first SIM card is different from the first PIN, verification of the first PIN fails, that is, the first PIN is incorrectly output.

In a possible implementation, the interface for enabling a PIN verification function further includes a PIN prompt description, and the PIN prompt description includes: an initial PIN prompt, an initial PIN change prompt, and a prompt for entering an incorrect PIN.

In this way, the user may obtain, on the interface for enabling a PIN verification function, information such as an initial PIN, a requirement that the initial PIN needs to be changed to improve security, and a step after the PIN is entered. This can improve user experience.

In a possible implementation, after the PIN verification function of the first SIM card is enabled, the terminal device may display the PIN setting interface, where the first control on the PIN setting interface is in an on state, the PIN setting interface displays second prompt information, and the second prompt information prompts the user to enable a function of remembering a PIN.

In this way, the terminal device may prompt the user to enable the function of remembering a PIN, to improve a probability that the user enables the function of remembering a PIN.

In a possible implementation, in response to that the user turns off the first control, the terminal device displays a first interface for entering the PIN of the first SIM card. In response to that the user enters a second PIN on the first interface, the terminal device verifies the second PIN based on the PIN of the first SIM card. The terminal device outputs third prompt information in response to that verification of the second PIN succeeds, where the third prompt information prompts whether to adjust the PIN of the first SIM card to the initial PIN.

In this manner, when the user disables the PIN verification function of the first SIM card, the user needs to enter the PIN of the first SIM card, to prevent another user from randomly disabling the PIN verification function of the first SIM card.

In a possible implementation, the terminal device adjusts the PIN of the first SIM card to the initial PIN in response to receiving an adjustment indication entered by the user, where the adjustment indication indicates that the user agrees to adjust the PIN of the first SIM card to the initial PIN.

In this manner, when the user disables the PIN verification function of the first SIM card, the terminal device may prompt the user to restore the PIN of the first SIM card to the initial PIN, to avoid a problem that the user forgets the PIN next time the user needs to enter the PIN of the first SIM card.

In a second manner, in response to that the user operates the option for changing a PIN of a SIM card, the terminal device displays a second interface for entering the PIN of the first SIM card. In response to that the user enters a third PIN on the second interface, the terminal device verifies the third PIN based on the PIN of the first SIM card. In response to that verification of the third PIN succeeds, the terminal device displays an interface for entering a new PIN, where the interface for entering a new PIN includes a PIN setting mode, and the setting mode includes length information of the PIN.

In this manner, when the user changes the PIN of the first SIM card, the user needs to enter the PIN of the first SIM card, to prevent another user from randomly changing the PIN of the first SIM card. This improves security of a SIM card.

In a third manner, the PIN setting interface includes an option for remembering a PIN, and the option for remembering a PIN includes a second control. In response to that the user turns on the second control, the terminal device detects whether the terminal device sets a lock screen password. In response to that the terminal device sets the lock screen password, the terminal device displays a third interface for entering the PIN of the first SIM card. In response to that the user enters a fourth PIN on the third interface, the terminal device verifies the fourth PIN based on the PIN of the first SIM card. In response to that verification of the fourth PIN succeeds, the terminal device correspondingly stores a first integrated circuit card identifier ICCID of the first SIM card and the PIN of the first SIM card.

In this manner, when the user enables a function of remembering a PIN, the user needs to enter the PIN of the first SIM card, to prevent another user from randomly enabling the function of remembering a PIN. This improves security of a SIM card.

In a possible implementation, in response to that the terminal device does not set the lock screen password, the terminal device displays an interface for setting a lock screen password.

In this manner, when the user enables the function of remembering a PIN, the terminal device may prompt the user to set the lock screen password. The lock screen password is used as a verification condition for obtaining the PIN of the first SIM card, to improve storage security of the PIN.

In a possible implementation, in response to that the PIN verification function of the first SIM card is enabled, the terminal device detects whether the terminal device enables the function of remembering a PIN. If no, the terminal device displays an interface for entering the PIN of the first SIM card. If yes, the terminal device queries, in a stored mapping relationship between an ICCID and a PIN, a PIN to which the first ICCID is mapped. The terminal device verifies the PIN to which the first ICCID is mapped.

In this manner, after the user enables the function of remembering a PIN, in a scenario in which the PIN needs to be verified, the terminal device may automatically verify the PIN of the first SIM card, and the user does not need to manually enter the PIN. This can improve user experience.

In this implementation, in other words, if a SIM card inserted into the terminal device is not the first SIM card but a second SIM card, in response to detecting that the terminal device is powered on or the second SIM card is inserted into the powered-on terminal device, the terminal device detects whether a PIN verification function of the second SIM card in the terminal device is enabled. In response to that the PIN verification function of the second SIM card is enabled, the terminal device detects whether the terminal device enables the function of remembering a PIN. If no, the terminal device displays an interface for entering a PIN of the second SIM card. If yes, the terminal device queries, in the stored mapping relationship between an ICCID and a PIN, a PIN to which a second ICCID of the second SIM card is mapped. The terminal device verifies the PIN to which the second ICCID is mapped.

The following uses an example in which the SIM card inserted into the terminal device is the second SIM card to describe the interface for entering the PIN of the second SIM card.

In a possible implementation, the interface for entering the PIN of the second SIM card includes a description identifier of remembering a PIN. The terminal device outputs fourth prompt information in response to that the user operates the description identifier of remembering a PIN, where the fourth prompt information prompts the user to enable the function of remembering a PIN.

After the terminal device enables the PIN verification function of the first SIM card, the terminal device may prompt the user to enable the function of remembering a PIN in the scenario in which the PIN needs to be verified, to improve a success rate that the user enables the function of remembering a PIN.

In a possible implementation, the interface for entering the PIN of the second SIM card further includes a PIN input box and a prompt box for remembering a PIN. In response to that the user enters a fifth PIN in the PIN input box and the user operates the prompt box for remembering a PIN, the terminal device verifies the fifth PIN based on the PIN of the second SIM card. In response to that verification of the fifth PIN succeeds, the terminal device detects whether the terminal device sets a lock screen password. If yes, the terminal device displays an interface for entering a lock screen password. If no, the terminal device displays an interface for setting a lock screen password.

In this manner, the terminal device may prompt the user to enable the function of remembering a PIN in the scenario in which the PIN needs to be verified, to improve a success rate that the user enables the function of remembering a PIN.

In a possible implementation, in response to that the user turns off the second control, the terminal device displays a fourth interface for entering the PIN of the first SIM card. In response to that the user enters a sixth PIN on the fourth interface, the terminal device verifies the sixth PIN based on a PIN of the first SIM card. In response to that verification of the sixth PIN succeeds, the terminal device disables the function of remembering a PIN, and deletes a mapping relationship between the first ICCID of the first SIM card and the PIN of the first SIM card.

In this manner, when the user disables the function of remembering a PIN, the user needs to enter the PIN of the first SIM card, to prevent another user from randomly disabling the function of remembering a PIN. This improves security of a SIM card.

It should be understood that, for manners in which the terminal device verifies the second PIN, the third PIN, the fourth PIN, the fifth PIN, and the sixth PIN, refer to the foregoing related descriptions of verifying the first PIN by the terminal device.

In a possible implementation, the interface for setting a lock screen password includes an option for disabling a lock screen password. The terminal device outputs fifth prompt information in response to detecting that the user operates the option for disabling a lock screen password, where the fifth prompt information prompts the terminal device to disable the function of remembering a PIN when the lock screen password is disabled.

It should be understood that the lock screen password is used as a verification condition for obtaining the PIN of the first SIM card. When the user disables the lock screen password of the terminal device, the terminal device may disable the function of remembering a PIN, to further improve storage security of the PIN.

In a possible implementation, in response to detecting an indication, entered by the user, for disabling the lock screen password, the terminal device displays an interface for entering a lock screen password. The terminal device verifies a first lock screen password in response to detecting that the user enters the first lock screen password on the interface for entering a lock screen password. In response to that verification of the first lock screen password succeeds, the terminal device disables the lock screen password and the function of remembering a PIN.

In this manner, when the user disables the lock screen password, the user needs to enter the lock screen password of the terminal device, to prevent another user from randomly disabling the lock screen password to disable the function of remembering a PIN. This improves security of a SIM card.

In a possible implementation, in response to that verification of a PIN entered by the user fails and a quantity of verification failures is greater than or equal to a preset quantity of times, the terminal device displays an interface for entering a PIN unlock key PUK. In response to detecting a PUK entered by the user, the terminal device verifies the PUK entered by the user. In response to that verification of the PUK entered by the user succeeds, the terminal device displays an interface for setting the PIN of the first SIM card.

In this implementation, if automatic verification of the PIN by the terminal device fails, it indicates that the user changes the PIN of the first SIM card. Alternatively, if verification of the PIN entered by the user fails, it indicates that the user forgets the PIN of the first SIM card. The terminal device may prompt the user to reset a PIN of the first SIM card, to improve security of the SIM card, and improve user experience.

In a possible implementation, the PIN setting interface includes an option for retrieving a PIN, an interface, for entering the PIN of the first SIM card, displayed by the terminal device when the user disables the PIN of the first SIM card is the first interface, an interface, for entering the PIN of the first SIM card, displayed by the terminal device when the user changes the PIN of the first SIM card is the second interface, and the first interface and the second interface each include a forgot password control.

In response to detecting that the user operates the option for retrieving a PIN or the user operates the forgot password control, the terminal device queries, in a stored mapping relationship between an ICCID and a PIN, a PIN to which a first ICCID of the first SIM card is mapped. The terminal device verifies the PIN to which the first ICCID is mapped. In response to that verification of the PIN to which the first ICCID is mapped succeeds, the terminal device displays an interface for entering a lock screen password. The terminal device verifies a second lock screen password in response to that the user enters the second lock screen password. In response to that verification of the second lock screen password succeeds, the terminal device displays an interface for setting the PIN of the first SIM card.

In this implementation, when the user forgets the PIN of the first SIM card, the terminal device may prompt the user to reset a PIN of the first SIM card, to prevent the terminal device from directly displaying the PIN of the first SIM card. This can improve security of the SIM card, and improve user experience.

According to a second aspect, an embodiment of this application provides a PIN processing apparatus. The PIN processing apparatus may be the terminal device in the first aspect, or a chip in the terminal device. The PIN processing apparatus may include: a SIM card check proxy module, an output module, a storage module, and a transceiver module.

The SIM card check proxy module is configured to: in response to detection of a terminal device being powered on or a first subscriber identification module SIM card being inserted into a powered-on terminal device, detect whether a PIN verification function of the first SIM card in the terminal device is enabled.

The output module is configured to output first prompt information in response to that the PIN verification function of the first SIM card is not enabled and the terminal device does not output the first prompt information, where the first prompt information is used to guide a user to enable the PIN verification function of the first SIM card.

In a possible implementation, the output module is specifically configured to output the first prompt information in response to that the PIN verification function of the first SIM card is not enabled, the terminal device does not output the first prompt information, and usage duration of the terminal device is greater than or equal to first preset duration.

In a possible implementation, the SIM card check proxy module is further configured to: record a first moment in response to detection of a SIM card being inserted into the terminal device for the first time, and use a difference between a current moment and the first moment as the usage duration.

In a possible implementation, the output module is specifically configured to output the first prompt information in response to that the PIN verification function of the first SIM card is not enabled, the terminal device does not output the first prompt information, the usage duration of the terminal device is greater than or equal to the first preset duration, and the user does not operate a PIN setting interface.

In a possible implementation, the storage module is configured to: in response to detection of operating the PIN setting interface by the user, store an operation record of operating the PIN setting interface by the user.

The SIM card check proxy module is further configured to query whether the terminal device stores the operation record.

In a possible implementation, the output module is specifically configured to output the first prompt information in response to that the PIN verification function of the first SIM card is not enabled, the terminal device does not output the first prompt information, the usage duration of the terminal device is greater than or equal to the first preset duration, the user does not operate the PIN setting interface, and the terminal device enables a preset security function.

In a possible implementation, the preset security function includes at least one of the following: a function of finding a mobile phone and a function of a secure payment center.

In a possible implementation, the transceiver module is configured to send a request command to the first SIM card, where the request command is used to request information about the first SIM card; and receive the information from the first SIM card, where the information indicates a status of the PIN verification function of the first SIM card, and the status includes on or off.

In a possible implementation, the storage module is configured to: in response to that the terminal device outputs the first prompt information, store an output record of outputting the first prompt information by the terminal device.

The SIM card check proxy module is further configured to: query whether the terminal device stores the output record; and if no, determine that the terminal device does not output the first prompt information.

In a possible implementation, the output module is a display module. The output module is specifically configured to display a notification box including the first prompt information.

In a possible implementation, the output module is further configured to display a PIN-related interface in response to detection of operating the notification box by the user, where the PIN-related interface includes information about a PIN.

In a possible implementation, the output module is further configured to display the PIN setting interface in response to that duration of displaying the PIN-related interface reaches second preset duration.

In a possible implementation, the PIN-related interface includes a PIN setting control. The output module is further configured to display the PIN setting interface in response to that the user operates the PIN setting control.

In a possible implementation, the PIN setting interface includes an option for enabling SIM card protection, and the option for enabling SIM card protection includes a first control. The output module is further configured to: in response to that the user turns on the first control, display an interface for enabling a PIN verification function, where the interface for enabling a PIN verification function prompts the user to enter the PIN of the first SIM card.

The SIM card check proxy module is further configured to: in response to that the user enters a first PIN on the interface for enabling a PIN verification function, verify the first PIN based on the PIN of the first SIM card; and enable the PIN verification function of the first SIM card in response to that verification of the first PIN succeeds.

In a possible implementation, the interface for enabling a PIN verification function further includes a PIN prompt description, and the PIN prompt description includes: an initial PIN prompt, an initial PIN change prompt, and a prompt for entering an incorrect PIN.

In a possible implementation, the output module is further configured to display the PIN setting interface, where the first control on the PIN setting interface is in an on state, the PIN setting interface displays second prompt information, and the second prompt information prompts the user to enable a function of remembering a PIN.

In a possible implementation, the output module is further configured to: in response to that the user turns off the first control, display a first interface for entering the PIN of the first SIM card.

The SIM card check proxy module is further configured to: in response to that the user enters a second PIN on the first interface, verify the second PIN based on the PIN of the first SIM card.

The output module is further configured to output third prompt information in response to that verification of the second PIN succeeds, where the third prompt information prompts whether to adjust the PIN of the first SIM card to an initial PIN.

In a possible implementation, the SIM card check proxy module is further configured to adjust the PIN of the first SIM card to the initial PIN in response to receiving of an adjustment indication entered by the user, where the adjustment indication indicates that the user agrees to adjust the PIN of the first SIM card to the initial PIN.

In a possible implementation, the PIN setting interface includes an option for changing a PIN of a SIM card. The output module is further configured to: in response to that the user operates the option for changing a PIN of a SIM card, display a second interface for entering the PIN of the first SIM card.

The SIM card check proxy module is further configured to: in response to that the user enters a third PIN on the second interface, verify the third PIN based on the PIN of the first SIM card.

The output module is further configured to: in response to that verification of the third PIN succeeds, display an interface for entering a new PIN, where the interface for entering a new PIN includes a PIN setting mode, and the setting mode includes length information of the PIN.

In a possible implementation, the PIN setting interface includes an option for remembering a PIN, and the option for remembering a PIN includes a second control. The SIM card check proxy module is further configured to: in response to that the user turns on the second control, detect whether the terminal device sets a lock screen password.

The output module is further configured to: in response to that the terminal device sets the lock screen password, display a third interface for entering the PIN of the first SIM card.

The SIM card check proxy module is further configured to: in response to that the user enters a fourth PIN on the third interface, verify the fourth PIN based on the PIN of the first SIM card.

The storage module is configured to: in response to that verification of the fourth PIN succeeds, correspondingly store a first integrated circuit card identifier ICCID of the first SIM card and the PIN of the first SIM card.

In a possible implementation, the output module is further configured to: in response to that the terminal device does not set the lock screen password, display an interface for setting a lock screen password.

In a possible implementation, the SIM card check proxy module is further configured to: in response to detection of the terminal device being powered on or a second SIM card being inserted into the powered-on terminal device, detect whether a PIN verification function of the second SIM card in the terminal device is enabled; and in response to that the PIN verification function of the second SIM card is enabled, detect whether the terminal device enables a function of remembering a PIN.

The output module is further configured to: if the terminal device does not enable the function of remembering a PIN, display an interface for entering a PIN of the second SIM card.

The SIM card check proxy module is further configured to: if the terminal device enables the function of remembering a PIN, query, in a stored mapping relationship between an ICCID and a PIN, a PIN to which a second ICCID of the second SIM card is mapped; and verify the PIN to which the second ICCID is mapped.

In a possible implementation, the interface for entering the PIN of the second SIM card includes a description identifier of remembering a PIN. The output module is further configured to output fourth prompt information in response to that the user operates the description identifier of remembering a PIN, where the fourth prompt information prompts the user to enable the function of remembering a PIN.

In a possible implementation, the interface for entering the PIN of the second SIM card further includes a PIN input box and a prompt box for remembering a PIN. The SIM card check proxy module is further configured to: in response to that the user enters a fifth PIN in the PIN input box and the user operates the prompt box for remembering a PIN, verify the fifth PIN based on the PIN of the second SIM card; and in response to that verification of the fifth PIN succeeds, detect whether the terminal device sets a lock screen password.

The output module is further configured to: if the terminal device sets the lock screen password, display an interface for entering a lock screen password; or if the terminal device does not set the lock screen password, display an interface for setting a lock screen password.

In a possible implementation, the output module is further configured to: in response to that the user turns off the second control, display a fourth interface for entering the PIN of the first SIM card.

The SIM card check proxy module is further configured to: in response to that the user enters a sixth PIN on the fourth interface, verify the sixth PIN based on a PIN of the first SIM card; and in response to that verification of the sixth PIN succeeds, disable a function of remembering a PIN, and delete a mapping relationship between the first ICCID of the first SIM card and the PIN of the first SIM card.

In a possible implementation, the interface for setting a lock screen password includes an option for disabling a lock screen password. The output module is further configured to output fifth prompt information in response to detection of operating, by the user, the option for disabling a lock screen password, where the fifth prompt information prompts the terminal device to disable the function of remembering a PIN when the lock screen password is disabled.

In a possible implementation, the output module is further configured to: in response to detection of an indication, entered by the user, for disabling the lock screen password, display an interface for entering a lock screen password.

The SIM card check proxy module is further configured to verify a first lock screen password in response to detection of entering, by the user, the first lock screen password on the interface for entering a lock screen password; and in response to that verification of the first lock screen password succeeds, disable the lock screen password and the function of remembering a PIN.

In a possible implementation, the output module is further configured to: in response to that verification of a PIN entered by the user fails and a quantity of verification failures is greater than or equal to a preset quantity of times, display an interface for entering a PIN unlock key PUK.

The SIM card check proxy module is further configured to: in response to detection of a PUK entered by the user, verify the PUK entered by the user.

The output module is further configured to: in response to that verification of the PUK entered by the user succeeds, display an interface for setting the PIN of the first SIM card.

In a possible implementation, the PIN setting interface includes an option for retrieving a PIN, an interface, for entering the PIN of the first SIM card, displayed by the terminal device when the user disables the PIN of the first SIM card is the first interface, an interface, for entering the PIN of the first SIM card, displayed by the terminal device when the user changes the PIN of the first SIM card is the second interface, and the first interface and the second interface each include a forgot password control.

The SIM card check proxy module is further configured to: in response to detection of operating, by the user, the option for retrieving a PIN or the user operates the forgot password control, query, in a stored mapping relationship between an ICCID and a PIN, a PIN to which a first ICCID of the first SIM card is mapped; and verify the PIN to which the first ICCID is mapped.

The output module is further configured to: in response to that verification of the PIN to which the first ICCID is mapped succeeds, display an interface for entering a lock screen password.

The SIM card check proxy module is further configured to verify a second lock screen password in response to that the user enters the second lock screen password.

The output module is further configured to: in response to that verification of the second lock screen password succeeds, display an interface for setting the PIN of the first SIM card.

According to a third aspect, an embodiment of this application provides a PIN processing apparatus. The apparatus includes a processor and a memory. The memory is configured to store computer-executable program code, the program code includes instructions, and when the processor executes the instructions, the instructions enable the electronic device to perform the method in the first aspect.

According to a fourth aspect, an embodiment of this application provides an electronic device. The electronic device may be the PIN processing apparatus in the second aspect. The electronic device includes a unit, module, or circuit configured to perform the method in the first aspect.

According to a fifth aspect, an embodiment of this application provides a computer program product including instructions. When the computer program product runs on a computer, the computer is enabled to perform the method in the first aspect.

According to a sixth aspect, an embodiment of this application provides a computer-readable storage medium. The computer-readable storage medium stores instructions. When the computer-readable storage medium is run on a computer, the computer is enabled to perform the method in the first aspect.

For beneficial effect of possible implementations in the second aspect to the sixth aspect, refer to beneficial effect brought by the first aspect. Details are not described herein again.

Embodiments of this application provide a personal identification number PIN processing method and apparatus. The method includes: in response to detecting that a terminal device is powered on or a first subscriber identification module SIM card is inserted into a powered-on terminal device, detecting whether a PIN verification function of the first SIM card in the terminal device is enabled; and outputting first prompt information in response to that the PIN verification function of the first SIM card is not enabled and the terminal device does not output the first prompt information, where the first prompt information is used to guide a user to enable the PIN verification function of the first SIM card. The method provided in embodiments of this application may be used to guide the user to enable the PIN verification function of the first SIM card, and efficiency is high.

BRIEF DESCRIPTION OF THE DRAWINGS

FIG. 12A-a to FIG. 12A-e are a schematic diagram of another interface change of a terminal device according to an embodiment of this application;

FIG. 12B-a to FIG. 12B-f are a schematic diagram of another interface change of a terminal device according to an embodiment of this application.

DETAILED DESCRIPTION OF ILLUSTRATIVE EMBODIMENTS

Figure 1:
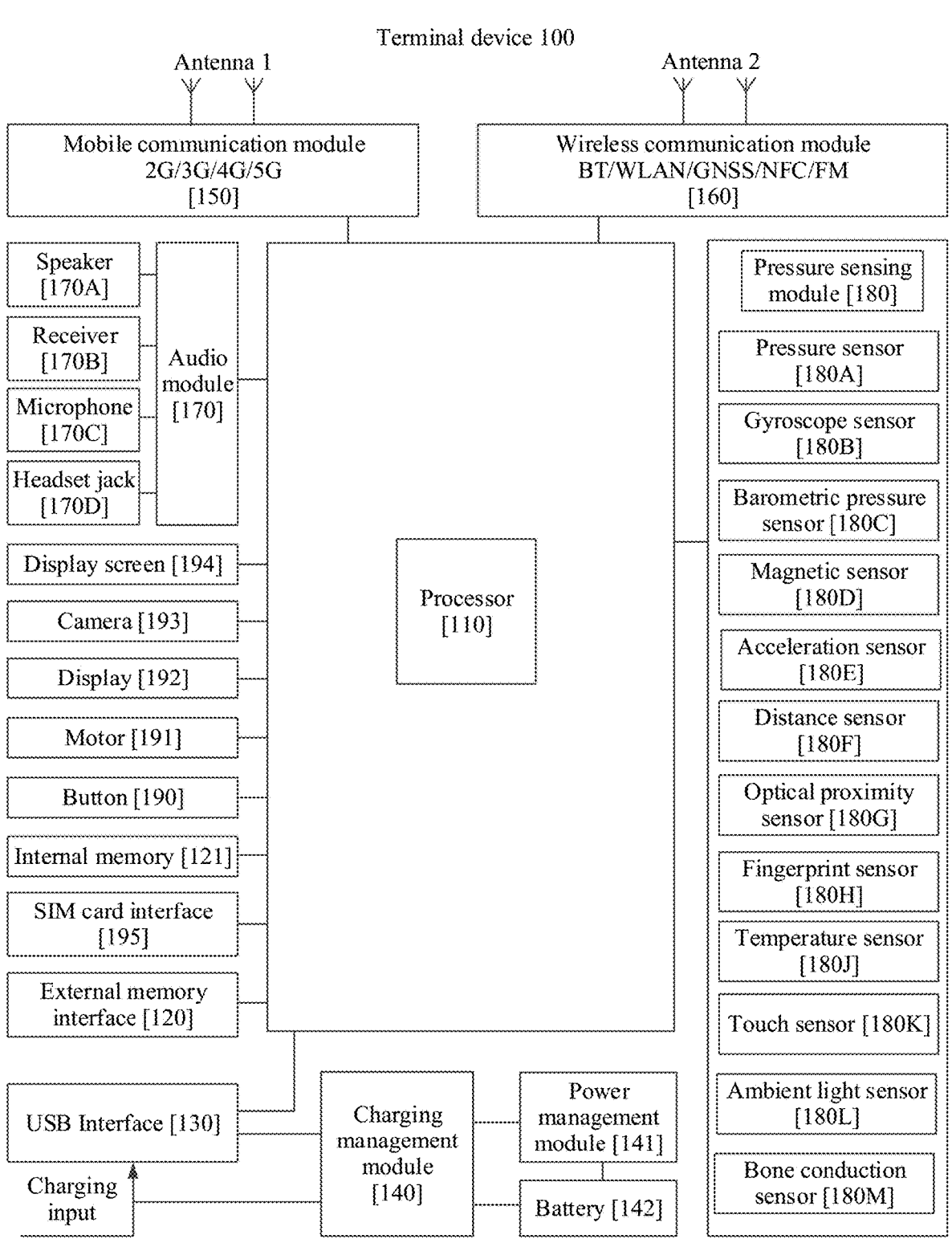
FIG. 1 is a schematic diagram of a structure of a terminal device according to an embodiment of this application.

FIG. 1 is a schematic diagram of a structure of a terminal device according to an embodiment of this application. The terminal device in embodiments of this application may be referred to as user equipment (user equipment, UE), a mobile terminal (mobile terminal), a terminal (terminal), or the like. The terminal device may be a personal digital assistant (personal digital assistant, PDA), a handheld device with a wireless communication function, a computing device, a vehicle-mounted device, a wearable device, a virtual reality (virtual reality, VR) terminal device, an unmanned aerial vehicle device, an augmented reality (augmented reality, AR) terminal device, a wireless terminal in industrial control (industrial control), a wireless terminal in self driving (self driving), a wireless terminal in a smart city (smart city), a wireless terminal in a smart home (smart home), or the like. A form of the terminal device is not specifically limited in embodiments of this application. It should be understood that the following provides descriptions by using an example in which the terminal device is a mobile phone.

As shown in the FIG. 1, in some embodiments of this application, a terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor 180, a button 190, a motor 191, an indicator 192, a camera 193, a display screen 194, a subscriber identification module (subscriber identification module, SIM) card interface 195, and the like. It can be understood that the structure shown in this embodiment does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a display processing unit (display processing unit, DPU), a neural network processing unit (neural network processing unit, NPU), and/or the like. Different processing units may be independent components, or may be integrated into one or more processors. In some embodiments, the terminal device 100 may alternatively include one or more processors 110. The processor may be a nerve center and a command center of the terminal device 100. The processor may generate an operation control signal based on an instruction operation code and a time sequence signal to complete control of instruction fetching and instruction execution. A memory may further be disposed in the processor 110, and is configured to store instructions and data. In some embodiments, the memory in the processor 110 is a cache memory. The memory may store instructions or data that are/is used or repeatedly used by the processor 110. If the processor 110 needs to use the instructions or the data again, the processor may directly invoke the instructions or the data from the memory. This avoids repeated access and reduces waiting time of the processor 110, to improve efficiency of the terminal device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. The USB interface 130 is an interface that conforms to USB standard specifications, and may be specifically a mini USB interface, a micro USB interface, a USB Type-C interface, or the like. The USB interface 130 may be used to connect to the charger to charge the terminal device 100, or may be used to transmit data between the terminal device 100 and a peripheral device, or may be configured to connect to a headset for playing audio through the headset.

It can be understood that an interface connection relationship between the modules illustrated in this embodiment of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the terminal device 100. The charging management module 140 may further supply power to the terminal device 100 by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal device 100 may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the terminal device 100 can be configured to cover one or more communication frequency bands. Different antennas may further be reused, to improve antenna utilization. For example, the antenna 1 may be reused as a diversity antenna of a wireless local area network. In some other embodiments, the antenna may be used in combination with a tuning switch.

The mobile communication module 150 can provide a wireless communication solution that is applied to the terminal device 100 and that is used for 2G, 3G, 4G, 5G, and the like. The mobile communication module 150 may include at least one filter, a switch, a power amplifier, a low noise amplifier, and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display screen 194. In some embodiments, the modem processor may be an independent component. In some other embodiments, the modem processor may be independent of the processor 110, and is disposed in a same device as the mobile communication module 150 or another functional module.

The wireless communication module 160 may provide a solution, applied to the terminal device 100, to wireless communication including a wireless local area network (wireless local area network, WLAN), Bluetooth, a global navigation satellite system (global navigation satellite system, GNSS), frequency modulation (frequency modulation, FM), NFC, an infrared (infrared, IR) technology, and the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The terminal device 100 implements a display function by using the GPU, the display screen 194, the application processor, and the like. The application processor may include an NPU and a DPU. The GPU is a microprocessor for image processing, and is connected to the display screen 194 and the application processor. The GPU is configured to: perform mathematical and geometric computation, and render an image. The processor 110 may include one or more GPUs that execute instructions to generate or change display information. The NPU is a neural-network (neural-network, NN) computing processor, quickly processes input information by referring to a structure of a biological neural network, for example, with reference to a transfer mode between human brain neurons, and may further continuously perform self-learning. Applications such as intelligent cognition of the terminal device 100, for example, image recognition, facial recognition, speech recognition, and text understanding, can be implemented by using the NPU. The DPU is also referred to as a display subsystem (Display Sub-System, DSS). The DPU is configured to adjust a color of the display screen 194, and the DPU may adjust the color of the display screen by using a three-dimensional lookup table (3D lookup table, 3D LUT). The DPU can also perform scaling, noise reduction, contrast enhancement, backlight brightness management, HDR processing, and display parameter Gamma adjustment on an image.

The display screen 194 is configured to display an image, video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini LED, a micro LED, a micro OLED, a quantum dot light-emitting diode (quantum dot light-emitting diode, QLED), or the like. In some embodiments, the terminal device 100 may include one or N display screens 194, where N is a positive integer greater than 1.

The terminal device 100 may implement a photographing function by using the ISP, one or more cameras 193, the video codec, the GPU, one or more display screens 194, the application processor, and the like.

The external memory interface 120 may be configured to connect to an external memory card, for example, a micro SD card, to extend a storage capability of the terminal device 100. The external memory card communicates with the processor 110 through the external memory interface 120, to implement a data storage function. For example, data files such as music, a photo, and video are stored in the external memory card.

The internal memory 121 may be configured to store one or more computer programs, and the one or more computer programs include instructions. The processor 110 runs the instructions stored in the internal memory 121, to perform various function applications of the terminal device 100 and data processing. The internal memory 121 may include a program storage area and a data storage area. The program storage area may store an operating system. The program storage area may further store one or more applications (for example, Gallery and Contacts), and the like. The data storage area may store data (for example, a photo and a contact) and the like created when the terminal device 100 is used. In addition, the internal memory 121 may include a high-speed random access memory, or may include a non-volatile memory, for example, at least one magnetic disk storage device, a flash memory, or a universal flash storage (universal flash storage, UFS). In some embodiments, the processor 110 runs instructions stored in the internal memory 121 and/or instructions stored in the memory disposed in the processor 110, to enable the terminal device 100 to perform various function applications and data processing.

The terminal device 100 may implement an audio function such as music playing or recording through the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110. The speaker 170A, also referred to as a "loudspeaker", is configured to convert an audio electrical signal into a sound signal. The terminal device 100 may be used to listen to music or answer a hands-free call through the speaker 170A. The receiver 170B, also referred to as an "earpiece", is configured to convert an audio electrical signal into a sound signal. When a call is answered or voice information is received by using the terminal device 100, the receiver 170B may be put close to a human ear to listen to a voice. The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, implement noise reduction, and identify a sound source, to implement a directional recording function and the like. The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The button 190 includes a power button, a volume button, and the like. The button 190 may be a mechanical button or a touch button. The terminal device 100 may receive a button input, and generate a button signal input related to a user setting and function control of the terminal device 100.

The SIM card interface 195 is configured to connect to a SIM card. The SIM card may be inserted into the SIM card interface 195 or removed from the SIM card interface 195, to implement contact with and separation from the terminal device 100. The terminal device 100 can support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The terminal device 100 interacts with a network by using the SIM card, to implement functions such as calling and data communication. In some embodiments, the terminal device 100 uses an embedded SIM card, namely, an eSIM (embedded-SIM) card, and the eSIM card may be embedded in the terminal device 100. In embodiments of this application, a pluggable SIM card may be disposed in the terminal device, or an embedded SIM card is disposed in the terminal device. It should be understood that the method provided in embodiments of this application is applicable to a terminal device provided with a SIM card and/or an eSIM card. In the following embodiments, an example in which a SIM card is provided for the terminal device is used for description.

The SIM card is a card including an integrated circuit. Internal storage space of the SIM card may store five types of data: fixedly stored data, network-related data that is temporarily stored, service data, user data, and application data. The fixedly stored data may be data written before the SIM card is sold, for example, an international mobile subscriber identity (international mobile subscriber identity, IMSI). The IMSI is information required when the SIM card is registered for and accesses a network. The network-related data that is temporarily stored is, for example, a location area identity (location area identity, LAI) and code of a public telephone network that cannot be accessed. The service data may include a personal identification number (personal identification number, PIN), a billing rate, and the like of the SIM card. A personal identification password of the SIM card is referred to as a "PIN" below. The user data may include a phone book. The application data may include a digital certificate, and the digital certificate may be understood as an identity of the SIM card in the network. The digital certificate may be used to perform processing such as encrypt, decrypt, digital signing, and signature authentication on data, of the SIM card, transmitted in the network, to ensure accuracy of the transmitted data.

Currently, a user usually uses a phone number as a user account of various applications. When the user performs registration, login, or verification on a terminal device, a server corresponding to the application sends a verification code to the phone number of the user. If the SIM card is lost, a malicious user may insert the SIM card into another terminal device and use a verification code to log in to various applications, which threatens user privacy and property security. For example, the malicious user logs in to a payment application by using a verification code, and transfers money stored in the payment application by the user, which causes loss to the property of the user. Currently, if the user loses the SIM card, the user may claim missing of the SIM card, to avoid privacy and property loss of the user. However, if the user does not claim missing in time, the user may still suffer loss.

To ensure security of the SIM card, the user may find an option for enabling a PIN of the SIM card on a setting page of the terminal device. However, a plurality of users do not know a location that the option for enabling a PIN is located on the setting page. Consequently, the user needs to spend a long time in searching for the option for enabling a PIN, and efficiency is low. In view of this, an embodiment of this application provides a PIN processing method. A terminal device may output prompt information to guide a user to enable a PIN verification function of a SIM card, and efficiency is high.

The following describes the PIN processing method provided in embodiments of this application with reference to specific embodiments. The following embodiments may be combined with each other, and same or similar concepts or processes are not be described in detail.

Figure 2:
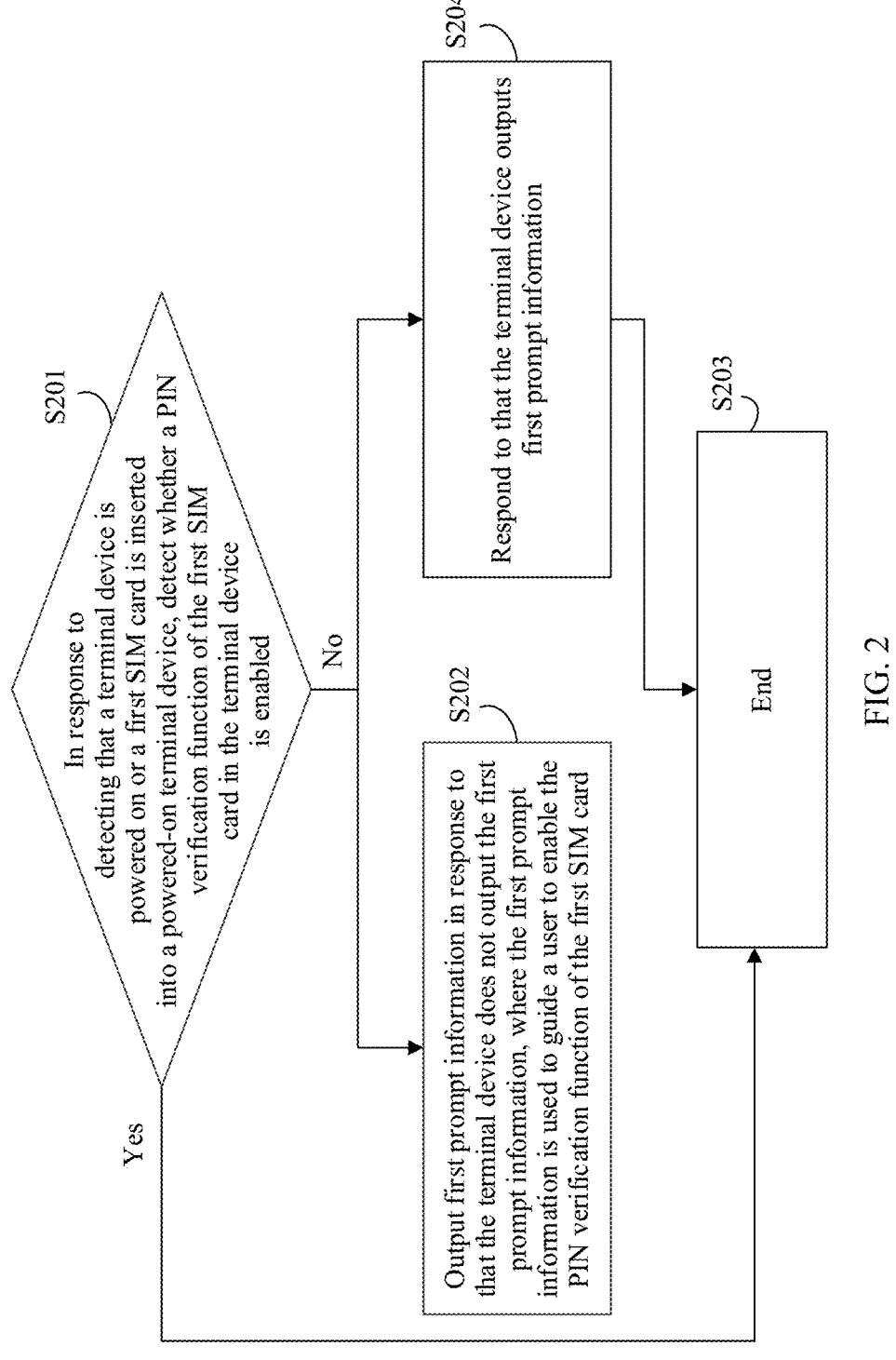
FIG. 2 is a schematic flowchart of an embodiment of a PIN processing method according to an embodiment of this application.

FIG. 2 is a schematic flowchart of an embodiment of a PIN processing method according to an embodiment of this application. As shown in FIG. 2, the PIN processing method provided in this embodiment of this application may include the following steps.

S201: In response to detecting that a terminal device is powered on or a first SIM card is inserted into a powered-on terminal device, detect whether a PIN verification function of the first SIM card in the terminal device is enabled; and if no, perform S202 or S204; or if yes, perform S203.

In an embodiment, if the first SIM card is inserted into the terminal device, when the terminal device is powered on, the terminal device needs to register the first SIM card for accessing a network, namely, performing international mobile subscriber identity (international mobile subscriber identity, IMSI) attach (IMSI attach), so that the terminal device can access the network by using the SIM card. When the terminal device registers the first SIM card for accessing a network, the terminal device may detect whether the PIN verification function of the first SIM card is enabled.

In an embodiment, the terminal device supports hot swap of a SIM card. When the terminal device is in a power-on state, a user may insert the first SIM card into the terminal device. The terminal device may determine, based on a card insertion signal (for example, a level signal) from a card slot, that a SIM card is inserted into the terminal device, and then register the SIM card for accessing a network. Likewise, when the terminal device registers the first SIM card for accessing a network, the terminal device may detect whether the PIN verification function of the first SIM card is enabled.

When the terminal device registers the first SIM card for accessing a network, the terminal device may interact with the first SIM card, to obtain information about the first SIM card. The information about the first SIM card may include information indicating whether the PIN verification function of the first SIM card is enabled, a remaining quantity of times of verification performed on a PIN when the PIN of the first SIM card is enabled, and the like. For example, when the terminal device into which the first SIM card is inserted is powered on or the first SIM card is inserted into the powered-on terminal device, the terminal device may send a select EF 3foo command to the first SIM card, to obtain the information about the first SIM card. When receiving the select EF 3foo command, the first SIM card may feed back the information about the first SIM card to the terminal device. For a field of the information fed back by the first SIM card, refer to the TS 102221 protocol in the 3rd generation partnership project (3rd Generation Partnership Project, 3GPP). In view of this, the terminal device may detect, based on the information about the first SIM card, whether the PIN verification function of the first SIM card is enabled. For a process of interaction between the terminal device and the first SIM card, refer to the TS 102221 protocol. In an embodiment, the select EF 3foo command may be referred to as a request command, and the request command is used to request the information about the first SIM card.

It should be understood that, if the first SIM card is an eSIM card, S201 may be replaced with: When the terminal device into which the first SIM card is embedded is powered on, determine whether the PIN verification function of the first SIM card is enabled.

S202: Output first prompt information in response to that the terminal device does not output the first prompt information, where the first prompt information is used to guide the user to enable the PIN verification function of the first SIM card.

The first prompt information is used to guide the user to enable the PIN verification function of the first SIM card. For example, the terminal device may output the first prompt information by displaying information on an interface of the terminal device or in a voice prompt manner. In the following embodiment, an example in which the terminal device outputs the first prompt information on an interface is used for description.

In an embodiment, when outputting the first prompt information, the terminal device may store an output record of outputting the first prompt information. If the terminal device detects that the terminal device does not store the output record, the terminal device may determine that the terminal device does not output the first prompt information, and may further output the first prompt information. For example, when the terminal device is powered on, if the terminal device sets a lock screen password, the terminal device may output the first prompt information on a lock screen interface. For example, if the terminal device is in an unlocked state, the terminal device may output the first prompt information on a home page, a currently displayed interface of the terminal device, a drop-down notification bar, a leftmost screen, or the like. This is not limited in embodiments of this application.

Figure 3:
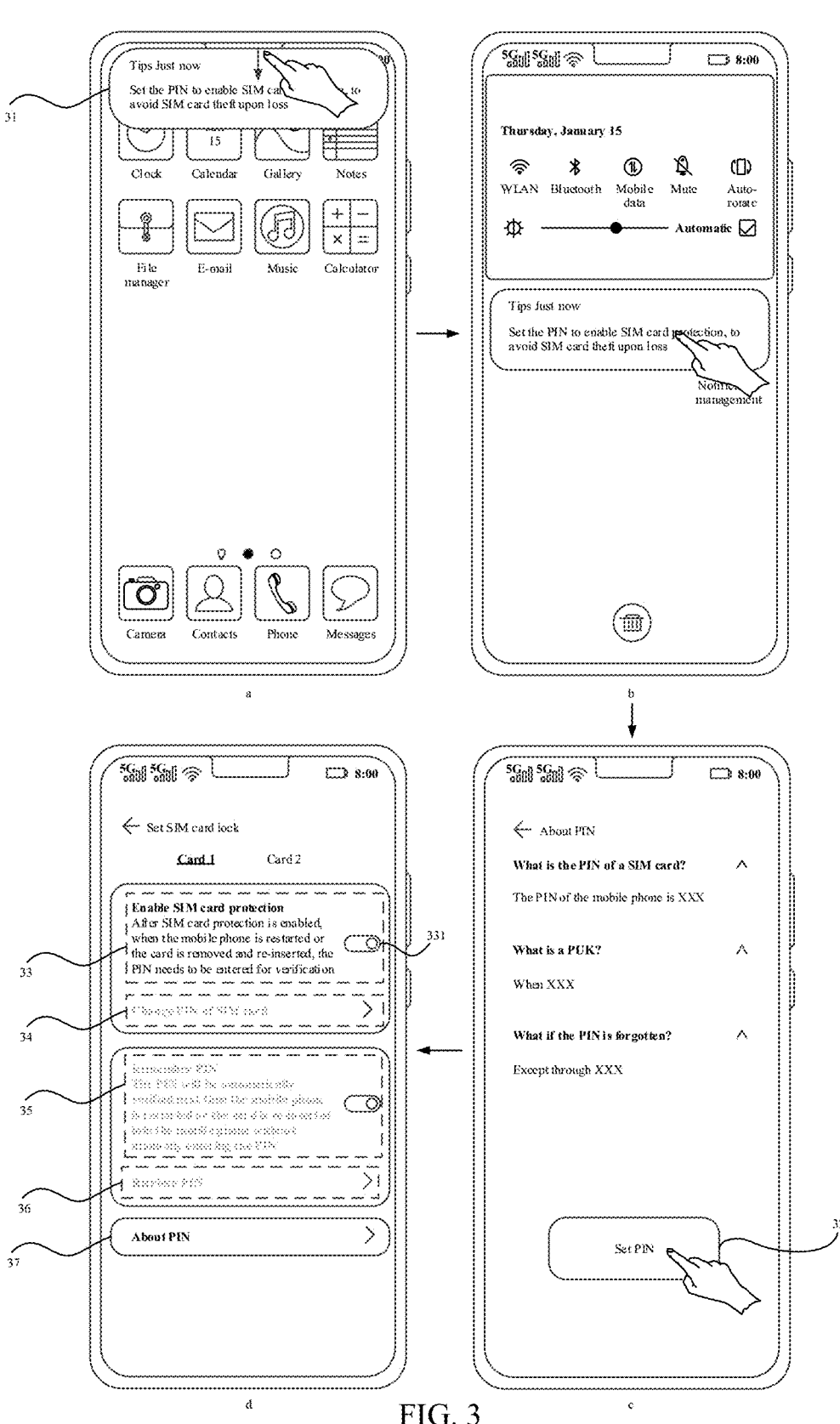
FIG. 3a to FIG. 3d are a schematic diagram of an interface change of a terminal device according to an embodiment of this application.

Herein, an example in which "the terminal device is in a power-on state" is used to describe a case in which the terminal device outputs the first prompt information. For example, the terminal device may output the first prompt information in a manner in which an application "Tips" outputs notification information. Refer to FIG. 3a. The terminal device may display a notification box 31 on the top of the home page. The notification box 31 includes the first prompt information, and the first prompt information may include text of "Set the PIN to enable SIM card protection, to avoid SIM card theft upon loss". The user may pull down the notification bar to view the first prompt information.

Refer to FIG. 3b. When the user pulls down the notification bar, the user may operate the first prompt information (for example, the user taps the notification box 31 in the notification bar), to trigger the terminal device to jump to an "About PIN" interface. Refer to FIG. 3c. The "About PIN" interface may include information about the PIN, to ensure that the user knows the PIN before enabling the PIN verification function. For example, the information about the PIN may include information such as "What is the PIN of a SIM card", "What is a PIN unlock key (personal identification number unlock key, PUK)", and "What if the PIN is forgotten".

In an embodiment, after reading the information about the PIN, the user may enable the PIN verification function of the first SIM card on a setting interface of the terminal device.

In an embodiment, the terminal device may guide the user to enable the PIN verification function of the first SIM card, to prevent the user from wasting time on enabling the PIN verification function of the first SIM card by the user. This improves user experience. For example, in an embodiment, after displaying the "About PIN" interface for second preset duration, the terminal device may automatically jump to the PIN setting interface. For example, the second preset duration may be 50s. Alternatively, in an embodiment, the "About PIN" interface further includes a "Set PIN" control 32. After reading the information about the PIN, the user may operate the "Set PIN" control 32, to trigger the terminal device to jump to the PIN setting interface. It should be understood that FIG. 3c is described by using an example in which the "About PIN" interface includes the "Set PIN" control 32.

Refer to FIG. 3d. The PIN setting interface may include an "Enable SIM card protection" option 33, a "Change PIN of SIM card" option 34, a "Remember PIN" option 35, a "Retrieve PIN" option 36, and an "About PIN" option 37. "Enable SIM card protection" may be understood as enabling a PIN verification function of the SIM card. "Remember PIN" may be understood as that the terminal device stores the PIN of the SIM card, so that when the PIN of the SIM card needs to be verified, the terminal device automatically verifies the PIN of the SIM card, and the user does not need to manually enter the PIN. That the PIN of the SIM card needs to be verified may include but is not limited to: powering on the terminal device, disabling the PIN of the SIM card, changing the PIN of the SIM card, hot swapping the SIM card, and the like. "Retrieve PIN" may be understood as that after the user forgets the PIN, the terminal device may prompt the user of the PIN of the SIM card. When the user taps the "About PIN" option 37, the terminal device may jump to the "About PIN" interface shown in FIG. 3c. It should be noted that "Set SIM card lock"

displayed in the PIN setting interface may be understood as "Set PIN". It should be understood that each option and a process of operating each option by the user are described in the following embodiments. Details are not described herein.

In this way, the user may enable the PIN verification function on the PIN setting interface. For example, the user may turn on a control 331 in the "Enable SIM card protection" option 33, to enable the PIN verification function of the SIM card. In comparison with the conventional technology, the terminal device may output the first prompt information, to guide the user to enable the PIN verification function of the SIM card, and efficiency is high.

In an embodiment, the PIN processing method provided in embodiments of this application is performed by a SIM card check proxy module in the terminal device. The SIM card check proxy module may report a reminding notification to a processing module in the application "Tips" in response to detection of not outputting the first prompt information by the terminal device. The reminding notification indicates the processing module to output the first prompt information. Therefore, in response to the reminding notification, the processing module in the application "Tips" detects whether the terminal device stores the record of outputting the first prompt information, and may further output the first prompt information in response to that the terminal device does not store the record.

In an embodiment, when receiving the reminding notification from the SIM card check proxy module, the processing module in the application "Tips" may detect whether the user enables a function of "Find mobile phone" and a function of "Secure payment center", and determine, based on a detection result, whether to output the first prompt information. In an embodiment, the function of "Find mobile phone" and the function of "Secure payment center" may be referred to as preset security functions. It should be understood that the preset security function may include but is not limited to the function of "Find mobile phone" and the function of "Secure payment center".

For example, the terminal device may include a "Find mobile phone" module and a "Secure payment center" module, and the "Find mobile phone" module and the "Secure payment center" module each are provided with a query interface externally. The query interface of the "Find mobile phone" module stores information about the function of "Find mobile phone", and the information about the function of "Find mobile phone" includes information about whether the function of "Find mobile phone" is enabled. Likewise, the query interface of the "Secure payment center" module stores information about the function of "Secure payment center", and the information about the function of "Secure payment center" includes information about whether the function of "Secure payment center" is enabled. In this way, the processing module in the application "Tips" may determine, by accessing the query interface of the "Find mobile phone" module, whether the function of "Find mobile phone" is enabled, and may determine, by accessing the query interface of the "Secure payment center" module, whether the function of "Secure payment center" is enabled.

In response to that the user enables a function such as "Find mobile phone" or "Secure payment center", the processing module in the application "Tips" may determine that the user has high security awareness. If a success rate that the user enables the PIN verification function of the SIM card is high after the first prompt information is output, the processing module in the application "Tips" may output the first prompt information. In response to that the user does not enable the function such as "Find mobile phone" or "Secure payment center", the processing module in the application "Tips" may not output the first prompt information.

In an embodiment, when detecting that the terminal device does not output the first prompt information, the terminal device may further detect whether the user operates the PIN setting interface. If the user operates the PIN setting interface, the terminal device may determine that the user knows the PIN, and may not output the first prompt information. If the terminal device detects that the user does not operate the PIN setting interface, the terminal device determines that the user does not know the PIN, and may output the first prompt information.

In an embodiment, that the terminal device detects whether the user operates the PIN setting interface may be detecting whether the user operates an option related to the PIN on the PIN setting interface. The option related to the PIN may be the "Enable SIM card protection" option 33, the "Change PIN of SIM card" option 34, the "Remember PIN" option 35, the "Retrieve PIN" option 36, and the "About PIN" option 37. If it is detected that the user operates the option related to the PIN on the PIN setting interface, the first prompt information may not be output. If it is detected that the user does not operate the option related to the PIN on the PIN setting interface, the first prompt information may be output.

For example, the terminal device may record the operation in response to detecting that the user operates the PIN setting interface (or the option related to the PIN on the PIN setting interface), so that the terminal device may query whether the terminal device stores a record of operating the PIN setting interface (or the option related to the PIN on the PIN setting interface), to determine to detect whether the user operates the PIN setting interface (or the option related to the PIN on the PIN setting interface). If the terminal device stores the record of operating the PIN setting interface (or the option related to the PIN on the PIN setting interface), the terminal device determines that the user operates the PIN setting interface (or the option related to the PIN on the PIN setting interface). If the terminal device does not store the record of operating the PIN setting interface (or the option related to the PIN on the PIN setting interface), the terminal device determines that the user does not operate the PIN setting interface (or the option related to the PIN on the PIN setting interface).

In an embodiment, when detecting that the terminal device does not output the first prompt information, the terminal device may further detect usage duration of the terminal device, and determine, based on the usage duration of the terminal device, whether to output the first prompt information. The terminal device may detect a moment (which may be understood as a moment at which a SIM card is inserted into the terminal device for the first time, where the moment may be referred to as a first moment) at which a $1^{st}$ SIM card is inserted into the terminal device, and record the moment as a moment at which the terminal device starts to be used. In this way, the terminal device may obtain the usage duration of the terminal device based on a difference between the moment at which the terminal device starts to be used and a current moment. For example, the terminal device may use the difference between the current moment and the first moment as the usage duration of the terminal device.

The terminal device may not output the first prompt information in response to that the usage duration of the terminal device is less than first preset duration. The terminal device outputs the first prompt information in response to that the usage duration of the terminal device is greater than or equal to the first preset duration. For example, the first preset duration may be 14 days. It should be understood that an objective of setting the first preset duration in this application is as follows: When the user just starts to use a new terminal device, the terminal device has much notification information and prompt information in first few days. If the terminal device outputs the first prompt information in the first few days, the user does not pay enough attention to the first prompt information, and prompt effect is poor. In this embodiment of this application, when the usage duration of the terminal device is set to be greater than or equal to 14 days, if it is detected that the terminal device does not output the first prompt information, the first prompt information may be output. Therefore, the user can effectively obtain the prompt information, and the success rate that the user enables the PIN verification function increases.

S203: End.

S204: Perform S203 in response to that the terminal device outputs the first prompt information.

In S203 and S204, if the PIN verification function of the first SIM card is enabled, or the terminal device outputs the first prompt information, the terminal device may determine that the user knows the PIN, and does not need to prompt the user to enable the PIN verification function of the SIM card, to avoid troubles caused to the user by a plurality of prompts.

It should be understood that, in embodiments of this application, that the terminal device outputs the first prompt information is for the terminal device. If the first prompt information is output when the first SIM card is inserted into the terminal device, when the user inserts a second SIM card into the terminal device, regardless of whether a PIN verification function of the second SIM card is enabled, the terminal device does not prompt the user to enable the PIN verification function of the SIM card, that is, the first prompt information is not output.

In embodiments of this application, in response to detecting that the terminal device is powered on or the first SIM card is inserted into the powered-on terminal device, the terminal device may detect whether the PIN verification function of the first SIM card in the terminal device is enabled. If the PIN verification function is not enabled, and the terminal device does not output the first prompt information, the terminal device may output the first prompt information, to guide the user to enable the PIN verification function of the first SIM card. Because the user does not need to search for the option for enabling a PIN verification function on the setting page of the terminal device in embodiments of this application, efficiency is high. In addition, in embodiments of this application, if the terminal device does not enable the PIN verification function, and the terminal device outputs the first prompt information, the terminal device does not prompt enabling of the PIN verification function, to avoid troubles caused to the user by a plurality of prompts. This improves user experience.

The following describes, based on the interface shown in FIG. 3d, each option on the PIN setting interface and a step of operating each option by the user.

1. Option for Enabling SIM Card Protection

Figure 4:
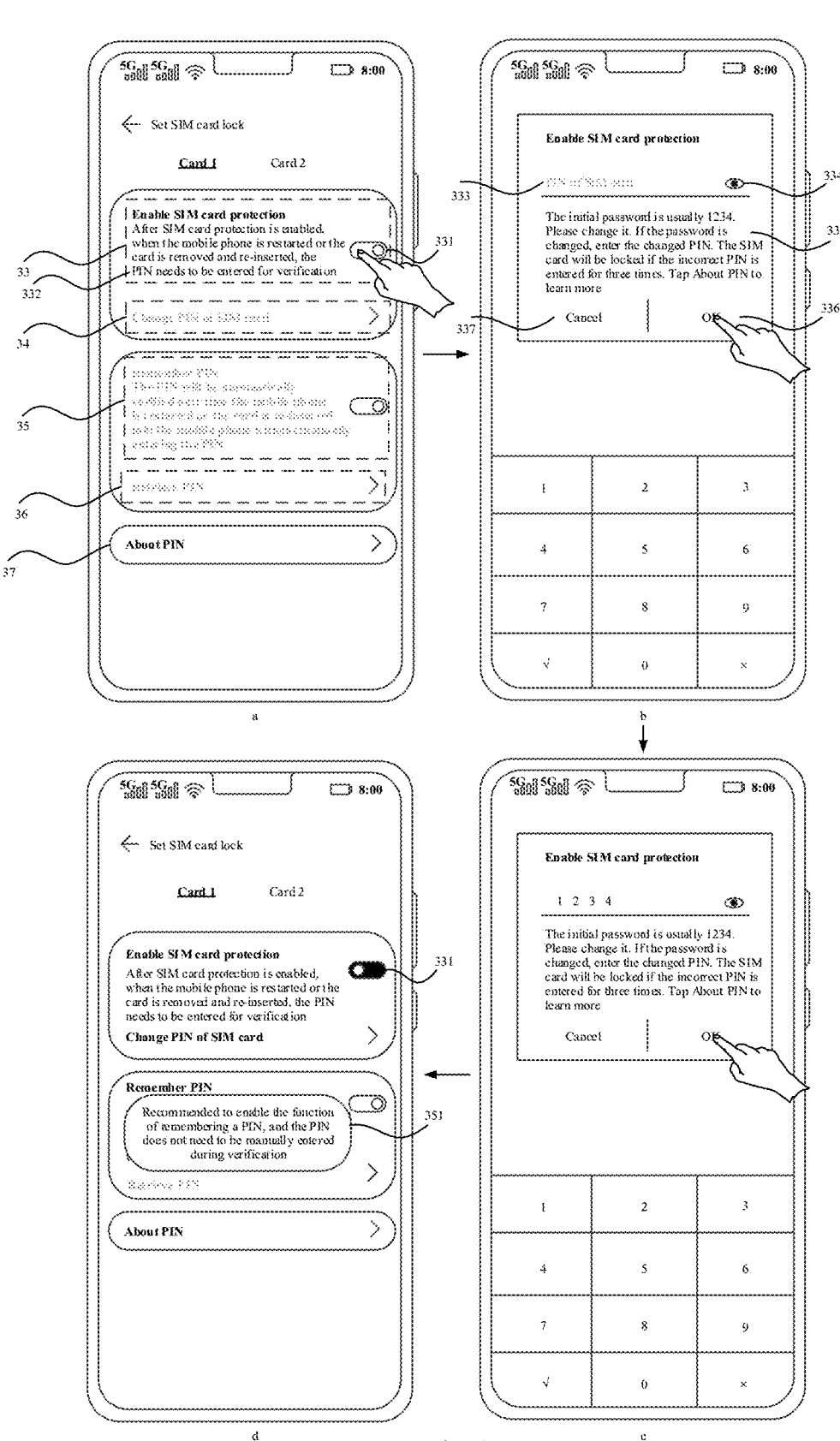
FIG. 4a to FIG. 4d are a schematic diagram of another interface change of a terminal device according to an embodiment of this application.

FIG. 4a to FIG. 4d are a schematic diagram of an interface change of a terminal device according to an embodiment of this application. Refer to FIG. 4a. The "Enable SIM card protection" option 33 includes the control 331 and a text description 332 for enabling SIM card protection. The user may operate the control 331 to disable or enable SIM card protection, that is, disabling or enabling a PIN verification function of a SIM card. The text description 332 for enabling SIM card protection may include, for example, "After SIM card protection is enabled, when the mobile phone is restarted or the card is removed and re-inserted, enter a PIN for verification". In an embodiment, the control 331 may be referred to as a first control.

It should be understood that when the terminal device does not enable SIM card protection, the control 331 is set to gray, that is, the control 331 is displayed in gray. It should be understood that in embodiments of this application, white indicates that the control is in an off state, and black indicates that the control is in an on state. When the terminal device does not enable SIM card protection, the "Change PIN of SIM card" option 34, the "Remember PIN" option 35, and the "Retrieve PIN" option 36 are all set to gray, and the user cannot operate the options 34 to 36.

When the user turns on the control 331, the terminal device may jump to an interface for enabling SIM card protection. Refer to FIG. 4b. The interface for enabling SIM card protection includes a "PIN of SIM card" input box 333, a plaintext conversion control 334, a PIN prompt description 335, an "OK" control 336, and a "Cancel" control 337. In an embodiment, the interface for enabling SIM card protection may be referred to as an "interface for enabling a PIN verification function", and the interface for enabling a PIN verification function may be referred to as an interface for entering a PIN of a first SIM card.

The "PIN of SIM card" input box 333 prompts the user to enter the PIN of the SIM card. It should be noted that, in embodiments of this application, when the user enables SIM card protection, the user needs to enter the PIN of the SIM card, to prevent another user from randomly enabling SIM card protection, which causes troubles to the user. If the user does not change the PIN of the SIM card, the PIN of the SIM card is an initial PIN, for example, 1234. The user may enter 1234 in the "PIN of SIM card" input box 333. If the user changes the PIN of the SIM card, the user needs to enter a changed PIN in the "PIN of SIM card" input box 333. In an embodiment, the PIN entered by the user in the "PIN of SIM card" input box 333 may be referred to as a first PIN.

The plaintext conversion control 334 is represented by an "eye" in FIG. 4b. The plaintext conversion control 334 is not described in embodiments of this application.

The PIN prompt description 335 may include: an initial PIN prompt, an initial PIN change prompt, and a prompt for entering an incorrect PIN. The initial PIN change prompt can improve security of the SIM card, and prevent another user from unlocking the SIM card by using the initial PIN. For example, the PIN prompt description 335 may include, for example, "The initial password is usually 1234. Please change it. If the password is changed, enter the changed PIN", and "The SIM card will be locked if the incorrect PIN is entered for three times. Tap About PIN to learn more".

It should be noted that the terminal device may determine the initial PIN of the SIM card based on an integrated circuit card identifier (integrated circuit card identifier, ICCID) of the SIM card, and then prompt the initial PIN of the SIM card in the PIN prompt description 335. In an embodiment, if the terminal device determines, based on the ICCID of the SIM card, that the SIM card is a SIM card of a preset type, a description of the initial PIN may be added to the PIN prompt description 335. However, if the SIM card is not a SIM card of a preset type, a description of the initial PIN is not added to the PIN prompt description 335. The preset type may indicate a preset operator.

Refer to FIG. 4c. An example in which the PIN of the SIM card is the initial PIN is used for description. When the user enters the initial PIN 1234 and taps the "OK" control 336, the terminal device may verify whether the PIN of the SIM card entered by the user is correct. After verification succeeds, the terminal device successfully enables SIM card protection, and may return to a PIN setting interface. That the terminal device enables SIM card protection may be understood as follows: The terminal device sends an indication for enabling SIM card protection to the first SIM card, and in response to the indication, the first SIM card may change a status of the PIN verification function of the first SIM card from "off" to "on".

Refer to FIG. 4d. After the terminal device successfully enables SIM card protection, the control 331 on the PIN setting interface is in an on state, and the user may operate the "Change PIN of SIM card" option 34 and the "Remember PIN" option 35.

It should be noted that a process in which the terminal device verifies the PIN of the SIM card entered by the user may be as follows: The first SIM card stores a PIN of the first SIM card, where the PIN is referred to as a second PIN. The terminal device sends the first PIN to the first SIM card in response to the collected PIN (the first PIN) entered by the user. The first SIM card may compare the first PIN with the second PIN for verification. If the first PIN is the same as the second PIN, the first SIM card determines that verification of the first PIN succeeds. If the first PIN is different from the second PIN, the first SIM card determines that verification of the first PIN fails. In an embodiment, the first SIM card may send a verification result of the PIN to the terminal device. The verification result indicates that verification of the first PIN succeeds or fails.

Refer to FIG. 4d. In an embodiment, the terminal device may display second prompt information in a floating manner on the "Remember PIN" option 35. The second prompt information prompts the user to enable a function of "Remember PIN". For example, a floating box 351 may include the second prompt information, and the second prompt information includes, for example, text of "Recommended to enable the function of remembering a PIN, and the PIN does not need to be manually entered during verification". For details of the function of "Remember PIN", refer to related descriptions of the following "Remember PIN" option 35. In an embodiment, the floating box 351 may disappear after being displayed for the preset duration.

In this way, the user may enable SIM card protection. In comparison with a manner in the conventional technology, efficiency of enabling SIM card protection can be improved.

The foregoing describes steps in which the user enables PIN protection. The following describes steps in which the user disables a PIN.

FIG. 5a to FIG. 5d are a schematic diagram of another interface of a terminal device according to an embodiment of this application. For FIG. 5a, refer to related descriptions in FIG. 4d. The user may turn off the control 331 on the PIN setting interface, to disable SIM card protection. In embodiments of this application, to prevent the user from forgetting the PIN after disabling SIM card protection, the terminal device may prompt the user to restore the PIN of the SIM card to the initial PIN, so that the user may enter the initial PIN to enable SIM card protection next time the user enables SIM card protection.

Figure 5:
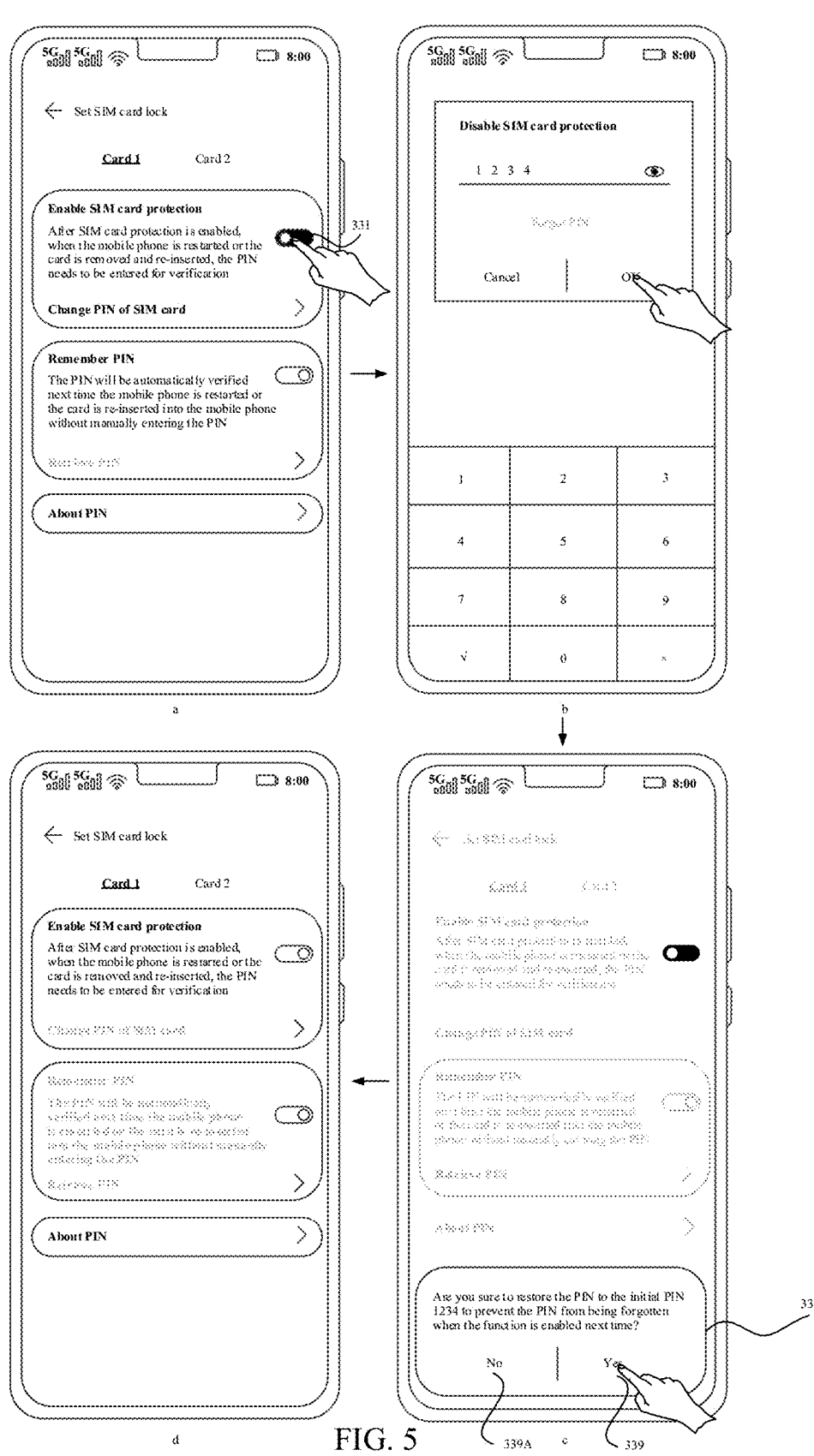
FIG. 5a to FIG. 5d are a schematic diagram of another interface change of a terminal device according to an embodiment of this application.

Refer to FIG. 5a. The user turns off the control 331, and the terminal device may jump to an interface for entering a PIN of a SIM card. The interface may be referred to as a first interface. It should be understood that, in embodiments of this application, when the user disables SIM card protection, the user needs to enter the PIN of the SIM card, to prevent another user from randomly disabling SIM card protection. This improves security of the SIM card. In an embodiment, a PIN entered by the user on the first interface may be referred to as a second PIN. The terminal device may verify the PIN entered by the user. For a verification manner, refer to the foregoing related descriptions. A difference between FIG. 5*b* and FIG. 4*b* lies in that because the user does not enable the function of "Remember PIN", the interface for entering a PIN of a SIM card includes text of "Forgot password" that is set to gray.

When the user enters a correct PIN on the interface shown in FIG. 5*b*, the terminal device may output third prompt information. The third prompt information prompts whether to adjust the PIN of the SIM card to the initial PIN. Refer to FIG. 5*c*. For example, the terminal device may display, in a prompt box 338, the third information of "Are you sure to restore the PIN to the initial PIN 1234 to prevent the PIN from being forgotten when the function is enabled next time?", a "Yes" control 339, and a "No" control 339A.

The user may operate the "Yes" control 339, to trigger the terminal device to adjust the PIN of the SIM card to the initial PIN, and disable SIM card protection. The user may operate the "No" control 339A, and may trigger the terminal device to disable SIM protection, but the PIN of the SIM card is not restored to the initial PIN.

In an embodiment, a manner in which the terminal device adjusts the PIN of the SIM card to the initial PIN may be as follows: The terminal device sends an adjustment indication to the first SIM card, and the first SIM card may change the PIN stored in the first SIM card to the initial PIN in response to the adjustment indication.

In an embodiment, a manner in which the terminal device adjusts the PIN of the SIM card to the initial PIN may be as follows: The terminal device sends the PIN of the first SIM card to the first SIM card, so that the first SIM card verifies the PIN of the first SIM card. For a manner in which the first SIM card verifies the PIN of the first SIM card, refer to the foregoing related descriptions. The terminal device may send the initial PIN to the first SIM card in response to that verification of the PIN of the first SIM card succeeds, so that the first SIM card restores the PIN of the first SIM card to the initial PIN.

That the terminal device disables SIM card protection may be understood as follows: The terminal device sends an indication for disabling SIM card protection to the first SIM card, and in response to the indication, the first SIM card may change a status of the PIN verification function of the first SIM card from "on" to "off".

It should be noted that, regardless of whether the user operates the "Yes" control 339 or the "No" control 339A, the terminal device may jump to the PIN setting interface. Refer to FIG. 5*d*. FIG. 5*d* is the same as FIG. 4*a*.

In this way, the user may disable SIM card protection. In addition, when the user disables SIM card protection, the terminal device may prompt the user to restore the PIN of the SIM card to the initial PIN, to avoid a case in which the user forgets the PIN, and consequently cannot enable SIM card protection next time. This improves user experience.

2. Option for Changing a PIN of a SIM Card

Figure 6:
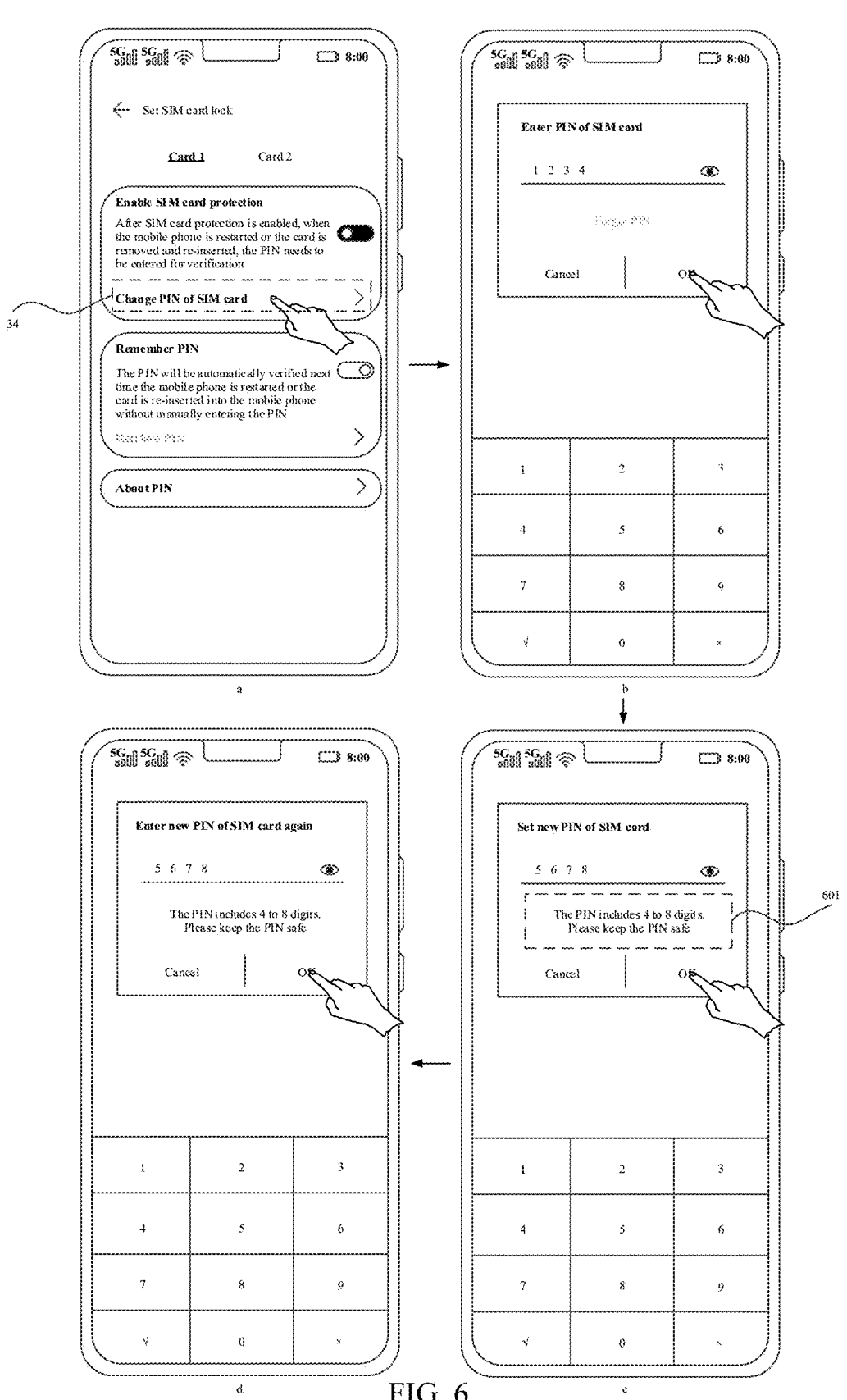
FIG. 6a to FIG. 6d are a schematic diagram of another interface change of a terminal device according to an embodiment of this application.

FIG. 6*a* to FIG. 6*d* are a schematic diagram of another interface of a terminal device according to an embodiment of this application. For FIG. 6*a*, refer to related descriptions in FIG. 4*d*. Because the user enables SIM card protection, the user may change the PIN of the SIM card on the PIN setting interface. For example, the user may operate the "Change PIN of SIM card" option 34, to trigger the terminal device to jump to the interface for entering a PIN, as shown in FIG. 6*b*. The interface may be referred to as a second interface. It should be understood that FIG. 6*b* is similar to FIG. 5*b*. In embodiments of this application, when the user changes the PIN of the SIM card, the user needs to enter the set PIN of the SIM card, to prevent another user from randomly changing the PIN of the SIM card. This improves security of the SIM card. In an embodiment, a PIN entered by the user on the second interface may be referred to as a third PIN.

The user enters a correct PIN of the SIM card, to trigger the terminal device to jump to an interface for entering a new PIN of a SIM card. Refer to FIG. 6*c*. The interface for entering a new PIN of a SIM card includes a prompt box 601 of a PIN setting mode, and the prompt box 601 of a PIN setting mode includes a PIN setting mode. The setting mode includes length information of the PIN. For example, the prompt box 601 may include a text prompt of "The PIN includes 4 to 8 digits. Please keep the PIN safe". The 4 to 8 digits indicate the length information of the PIN. The setting mode may further include that the PIN is a number. The user may enter a new PIN on the interface for entering a new PIN of a SIM card. In an embodiment, in response to the new PIN entered by the user, the terminal device may display an interface for re-entering a new PIN, as shown in FIG. 6*d*, to ensure accuracy of the new PIN.

It should be noted that when the user outputs the new PIN again, the terminal device may send the new PIN to the first SIM card in response to detecting that the new PINs entered by the user for two times are consistent. In response to receiving the new PIN, the first SIM card changes the PIN stored in the first SIM card to the new PIN. Therefore, the user can change the PIN.

3. Option for Remembering a PIN

In the current existing technical solution, after the user enables SIM card protection, each time the terminal device is powered on (or in a scenario in which the PIN of the SIM card needs to be entered), the user needs to manually enter the PIN of the first SIM card, and an operation is complex. In embodiments of this application, the terminal device provides an option for remembering a PIN, to automatically verify the PIN of the first SIM card. This prevents the user from manually entering the PIN of the first SIM card, and improves user experience.

Refer to related descriptions in FIG. 4*d*. In an embodiment, the terminal device may output the second prompt information when enabling SIM card protection, to prompt the user to enable the function of "Remember PIN". It should be understood that if the user enables the function of "Remember PIN", the terminal device may locally store the PIN of the first SIM card, so that when the PIN of the first SIM card needs to be verified, the terminal device may automatically verify the PIN based on the locally stored PIN of the first SIM card.

When the user enables SIM card protection, the terminal device may obtain the PIN of the first SIM card based on the PIN entered by the user, and store the PIN of the first SIM card in response to that the user enables the function of "Remember PIN".

In an embodiment, because at least one SIM card may be inserted into the terminal device, to distinguish PINs corresponding to different SIM cards, the terminal device may obtain a first ICCID of the first SIM card, use the first ICCID as an index to search for the PIN of the first SIM card, and store a mapping relationship between the first ICCID and the PIN of the first SIM card. It should be understood that the terminal device may send a SELECT FILE command to the first SIM card, to select a folder, of the first SIM card, that stores the ICCID. Then, the terminal device may send a READ BINARY command to the first SIM card, to read the first ICCID in the folder, to obtain the first ICCID of the first SIM card. For this process, refer to the TS 102221 protocol. In some other embodiments of this application, to ensure storage security of the PIN of the first SIM card, the terminal device may store the mapping relationship between the first ICCID and the PIN of the first SIM card in a trusted execution environment (trusted execution environment, TEE) or a secure area in a rich execution environment (rich execution environment, REE) of the terminal device.

It should be understood that, as an identifier number of the SIM card, the ICCID is a hardware identifier of the SIM card, and is not stored in internal storage space of the SIM card. The terminal device can obtain the ICCID of the SIM card without knowing the PIN of the SIM card. Therefore, in embodiments of this application, the first ICCID of the first SIM card is used as the index of the PIN of the first SIM card. When the terminal device stores the mapping relationship between the first ICCID and the PIN of the first SIM card, the terminal device may quickly and conveniently obtain, based on the first ICCID, the PIN that is stored in the terminal device and that is of the first SIM card.

In this way, in a scenario in which the PIN of the first SIM card needs to be verified, the terminal device may read the first ICCID of the first SIM card, and verify the PIN of the first SIM card based on the locally stored PIN to which the first ICCID is mapped. It should be understood that a manner in which the terminal device verifies the PIN may be as follows: The terminal device sends, to the first SIM card, the PIN to which the first ICCID is mapped, so that the first SIM card compares, for verification, the PIN stored in the first SIM card with the PIN to which the first ICCID is mapped, to obtain a verification result. For details, refer to related descriptions in the foregoing embodiments. When verification of the PIN by the first SIM card succeeds (that is, the PIN stored in the first SIM card is the same as the PIN to which the first ICCID is mapped), the first SIM card may send, to the terminal device, a verification result indicating that verification succeeds.

In embodiments of this application, the terminal device stores the mapping relationship between the first ICCID of the first SIM card and the PIN of the first SIM card in response to that the user enables the function of "Remember PIN". Therefore, when the PIN of the first SIM card needs to be verified, the terminal device can automatically verify the PIN, to prevent the user from manually entering the PIN. This can improve user experience.

The foregoing describes the function of "Remember PIN", and the following describes a step in which the user enables the function of "Remember PIN".

Figure 7:
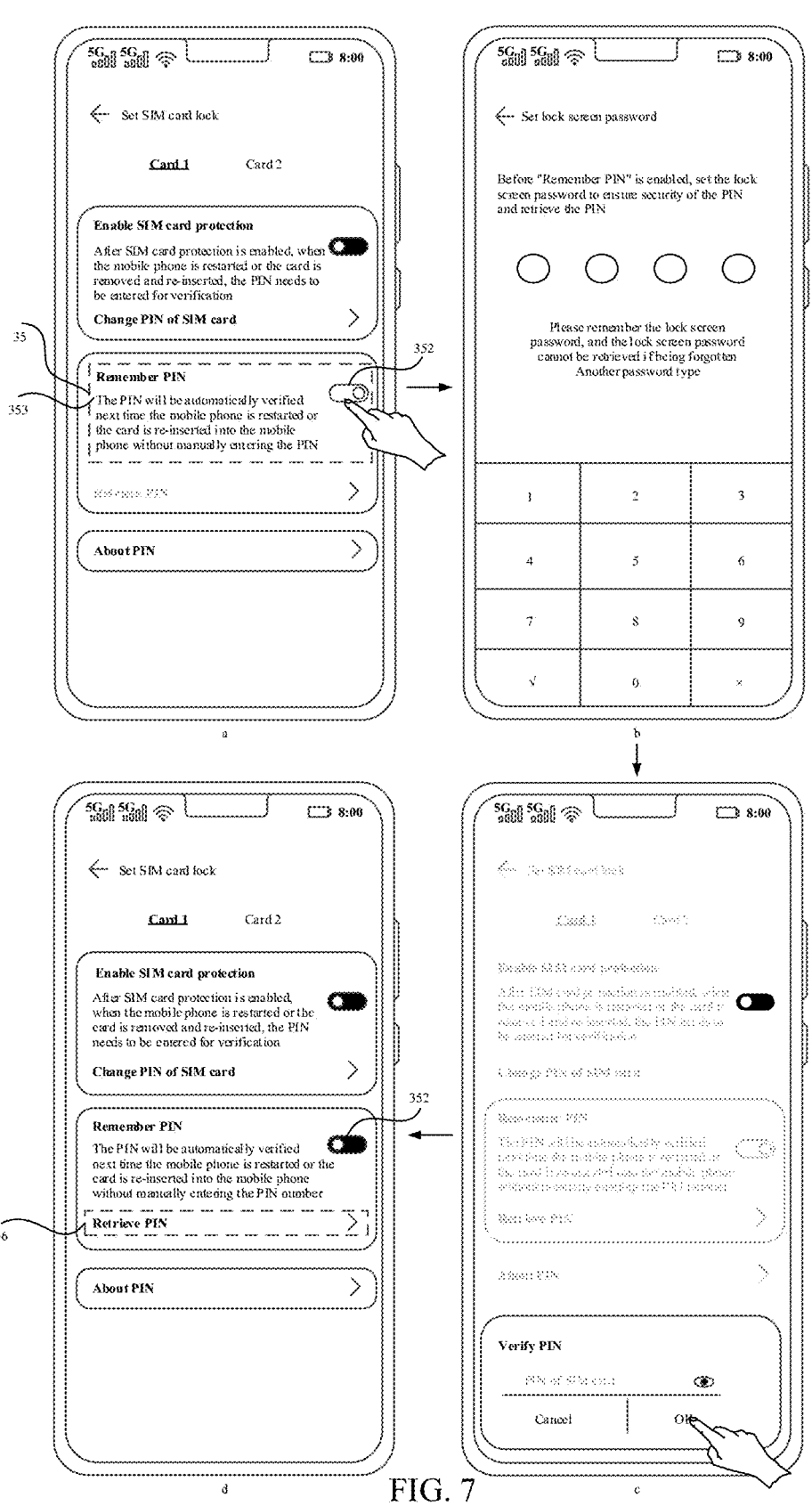
FIG. 7a to FIG. 7d are a schematic diagram of another interface change of a terminal device according to an embodiment of this application.

FIG. 7a to FIG. 7d are a schematic diagram of another interface of a terminal device according to an embodiment of this application. FIG. 7a is the same as FIG. 4d. Refer to FIG. 7a. The "Remember PIN" option 35 may include a control 352 and a text description 353 for remembering a PIN. When the user turns on the control 352, the terminal device may query whether the user sets a lock screen password. If the user does not set the lock screen password, the terminal device prompts the user to set the lock screen password first. The text description 353 for remembering a PIN may include text such as "The PIN will be automatically verified next time the mobile phone is restarted or the card is re-inserted into the mobile phone without manually entering the PIN". In an embodiment, the control 352 may be referred to as a second control.

It should be understood that, in embodiments of this application, an objective that the terminal device needs to set the lock screen password before enabling the function of remembering a PIN is as follows: That the terminal device remembers the PIN is essentially locally storing the mapping relationship between the first ICCID of the first SIM card and the PIN of the first SIM card. The locally stored mapping relationship is easily cracked by a malicious terminal, and PIN security is low. Therefore, the terminal device may store the mapping relationship between the first ICCID and the PIN of the first SIM card into an asset service (asset service) module in the TEE. Because data stored in the asset service module needs to be accessed by using the lock screen password, the lock screen password needs to be preset, to improve PIN security. In embodiments of this application, a process in which the terminal device accesses the asset service module by using the lock screen password, and obtains the PIN of the first SIM card is not described in detail. For details, refer to related descriptions of currently accessing an asset service module by using a lock screen password. It should be noted that, in embodiments of this application, that the lock screen password needs to be set before the function of remembering a PIN is enabled may also be understood as: The terminal device associates the lock screen password with the function of remembering a PIN.

When the user turns on the control 352, the terminal device may query whether the user sets the lock screen password.

Figure 10:
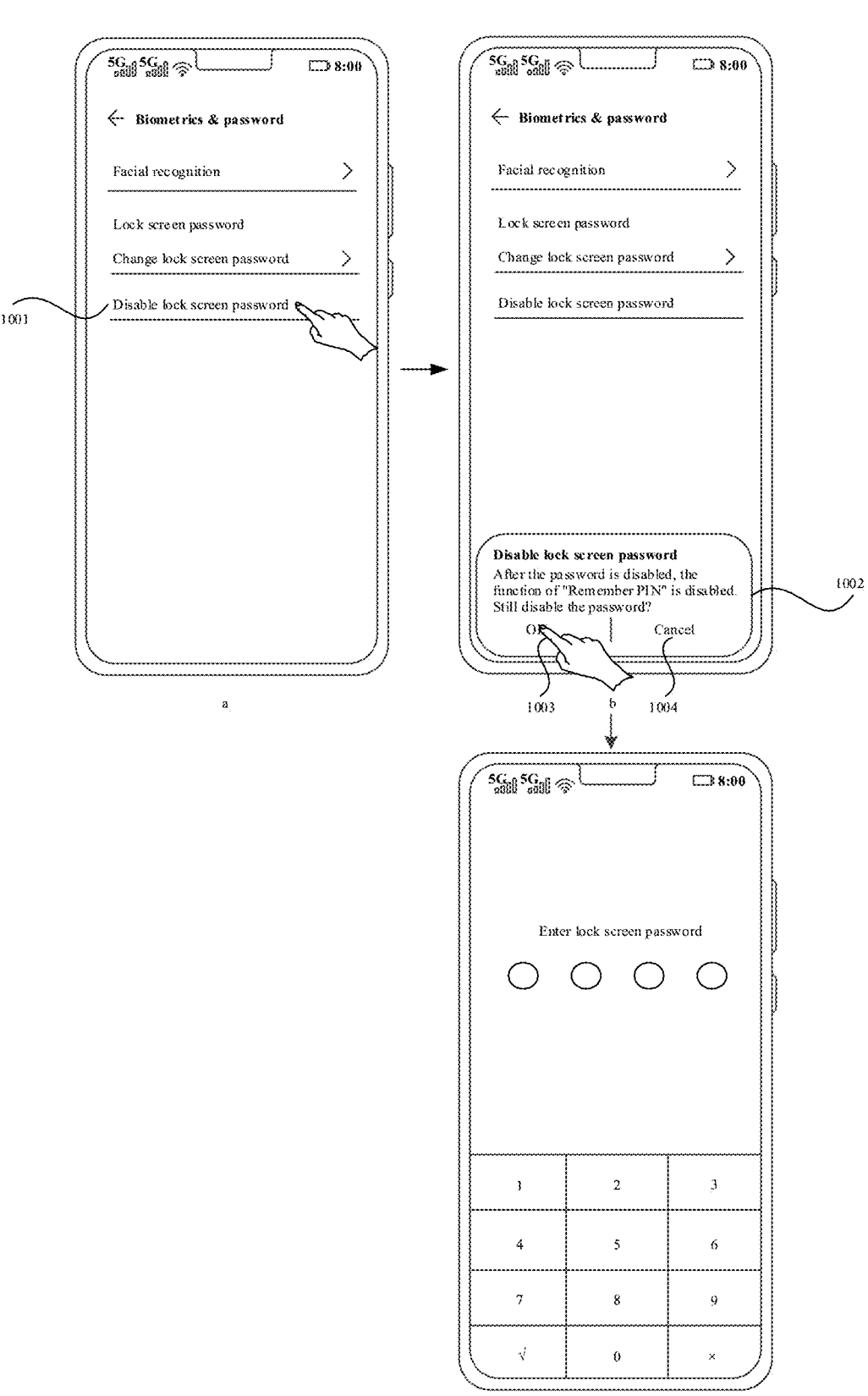
FIG. 10a to FIG. 10c are a schematic diagram of another interface change of a terminal device according to an embodiment of this application.

In an embodiment, if the user does not set the lock screen password, the terminal device may jump to an interface for setting a lock screen password, as shown in FIG. 7b. A process in which the user sets the lock screen password is not described in detail in embodiments of this application. For details, refer to related descriptions of setting a lock screen password in the conventional technology. It should be understood that FIG. 7b is described by using an example in which the lock screen password is set to a digital password. In an embodiment, the lock screen password may alternatively be a face, a fingerprint, or the like, as shown in FIG. 7b. As shown in FIG. 10a, the user may set the lock screen password of the terminal device on an interface shown in FIG. 10a.

After the user sets the lock screen password, the terminal device may jump to an interface for verifying a PIN. The interface may be referred to as a third interface. As shown in FIG. 7c, when the user enables the function of "Remember PIN", the user needs to enter the PIN of the first SIM card, to prevent another user from randomly enabling the function of "Remember PIN". This improves security of the first SIM card. In an embodiment, a PIN entered by the user on the third interface may be referred to as a fourth PIN.

When the user enters a correct PIN on the interface shown in FIG. 7c, the terminal device may jump to the PIN setting interface. A difference between FIG. 7d and FIG. 4d lies in that the control 352 is in an on state, and because the terminal device already stores the PIN of the first SIM card, the terminal device may provide a PIN retrieval service for the user. In other words, the user may operate the "Retrieve PIN" option 36 on the PIN setting interface.

In an embodiment, if the terminal device finds that the user sets the lock screen password, the terminal device may skip the interface shown in FIG. 7b, and jump to the interface for verifying a PIN shown in FIG. 7c. For details, refer to the foregoing related descriptions.

FIG. 7a to FIG. 7d describe a case in which the user may enable the function of "Remember PIN" on the PIN setting interface. In embodiments of this application, the terminal device may further prompt the user to enable the function of "Remember PIN" in another scenario in which the user needs to manually enter the PIN of the first SIM card.

Figure 8:
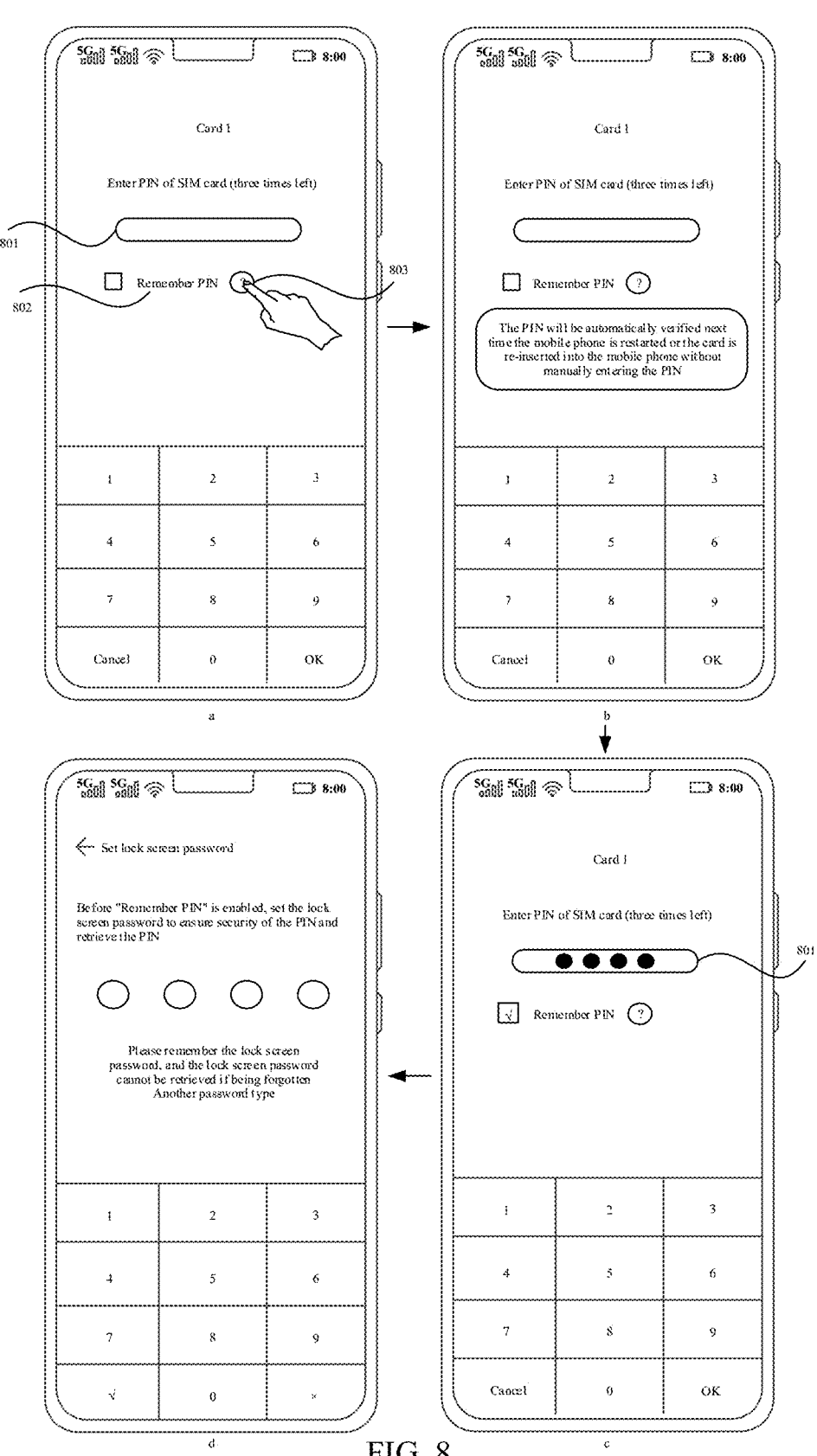
FIG. 8a to FIG. 8d are a schematic diagram of another interface change of a terminal device according to an embodiment of this application.

For example, the user enables SIM card protection, but does not enable the function of "Remember PIN". In a scenario in which the terminal device is restarted, the terminal device may display an interface for entering the PIN of the first SIM card, as shown in FIG. 8a. The interface includes: an identifier of a SIM card for which SIM card protection is enabled, for example, "Card 1", a remaining quantity of PIN verification times, for example, three times, a PIN input box 801, a "Remember PIN" prompt box 802, and a description identifier 803 of "Remember PIN". In FIG. 8a, a "question mark" indicates the description identifier 803. In this way, the user may operate the "Remember PIN" prompt box 802, to enable the function of "Remember PIN". In an embodiment, a PIN entered by the user on the interface shown in FIG. 8a may be referred to as a fifth PIN.

Refer to FIG. 8b. When the user operates the description identifier 803 of "Remember PIN", the terminal device outputs fourth prompt information. The fourth prompt information prompts the user to enable the function of "Remember PIN". For example, the fourth prompt information may be text such as "The PIN will be automatically verified next time the mobile phone is restarted or the card is re-inserted into the mobile phone without manually entering the PIN". In an embodiment, the fourth prompt information may be the same as the second prompt information.

Refer to FIG. 8c. When the user enters a PIN in the input box 801, and operates the "Remember PIN" prompt box 802, the terminal device may verify whether the PIN entered by the user is correct. If the user sets the lock screen password, in response to that the user enters the correct PIN, the terminal device may jump to an interface for entering a lock screen password. If the user does not set the lock screen password, in response to that the user enters a correct PIN, the terminal device prompts the user to set the lock screen password. For example, the terminal device may jump to an interface for prompting the user to set the lock screen password. Refer to FIG. 8d. For the interface for setting a lock screen password, refer to related descriptions in FIG. 7a to FIG. 7d.

It should be understood that in this embodiment, if the SIM card inserted into the terminal device is the second SIM card instead of the first SIM card, the terminal device may prompt the user to enable the function of "Remember PIN" in a scenario in which the user needs to manually enter a PIN of the second SIM card in embodiments of this application.

For example, the user enables a PIN verification function of the second SIM card (refer to related descriptions in which the user enables the PIN of the first SIM card in the foregoing embodiment), but does not enable the function of "Remember PIN". In the scenario in which the terminal device is restarted, the terminal device may display an interface for entering the PIN of the second SIM card, and the interface for entering the PIN of the second SIM card may be the same as the interface shown in FIG. 8a. In the scenario of the second SIM card, the terminal device may alternatively display an interface from FIG. 8b to FIG. 8d. For details, refer to the foregoing related descriptions.

The foregoing describes a step in which the user enables the function of "Remember PIN", and the following describes a step in which the user disables the function of "Remember PIN" after enabling the function of "Remember PIN".

Figure 9:
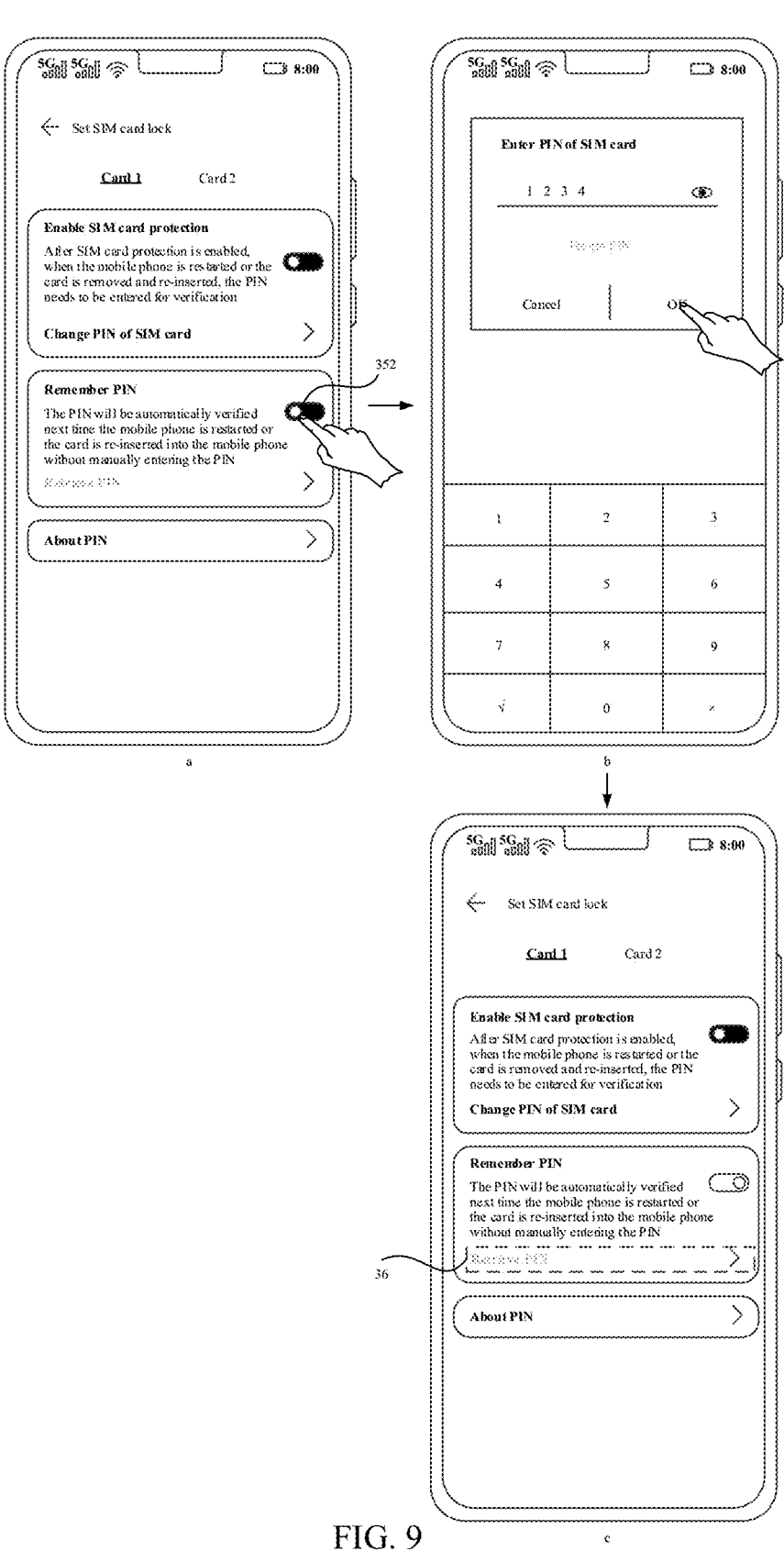
FIG. 9a to FIG. 9c are a schematic diagram of another interface change of a terminal device according to an embodiment of this application.

Refer to FIG. 9a. The user may turn off the control 352 on the PIN setting interface, to disable the function of "Remember PIN". The user turns off the control 352, and the terminal device may jump to the interface for entering a PIN, to prompt the user to enter the PIN of the first SIM card, as shown in FIG. 9b. The interface for entering a PIN may be referred to as a fourth interface. When the user enters the correct PIN, the terminal device may delete the locally stored mapping relationship between the first ICCID of the first SIM card and the PIN of the first SIM card, and jump to the PIN setting interface. The control 352 on the PIN setting interface is in an off state, as shown in FIG. 9c. In an embodiment, a PIN entered by the user on the fourth interface may be referred to as a sixth PIN.

It should be understood that after the user disables the function of "Remember PIN", because the terminal device deletes the mapping relationship between the first ICCID of the first SIM card and the PIN of the first SIM card, the terminal device cannot provide the PIN retrieval service for the user. Therefore, in the interface shown in FIG. 9c, the user cannot operate the "Retrieve PIN" option 36.

When the user enables the function of "Remember PIN", the lock screen password needs to be set, that is, the terminal device may associate the lock screen password with the function of remembering a PIN. Therefore, in an embodiment, when the user disables the lock screen password of the terminal device, the terminal device may prompt the user that the function of "Remember PIN" is disabled after the lock screen password is disabled, to protect security of the PIN, and ensure that the user knows that the function of "Remember PIN" cannot be used after the lock screen password is disabled.

For example, FIG. 10a shows an interface for setting a lock screen password, and the interface for setting a lock screen password may include a "Disable lock screen password" option 1001. The terminal device may display fifth prompt information in response to that the user operates the "Disable lock screen password" option 1001. The fifth prompt information prompts the user that "the function of remembering a PIN is disabled after the lock screen password is disabled". Refer to FIG. 10b. For example, the terminal device may display a prompt box 1002 of the fifth prompt information, and the prompt box 1002 may include text such as "After the password is disabled, the function of "Remember PIN" is disabled. Still disable the password?", an "OK" control 1003, and a "Cancel" control 1004.

In an embodiment, if the user taps the "OK" control 1003, the terminal device may disable the lock screen password, and disable the function of "Remember PIN". Therefore, in a scenario in which the PIN of the first SIM card needs to be entered, the user needs to manually enter the PIN of the first SIM card.

In an embodiment, when the user disables the lock screen password, the terminal device may display the interface for entering a lock screen password, and disable the function of "Remember PIN" after verification of the lock screen password succeeds, to protect security of the SIM card, and prevent another user from randomly disabling the function of "Remember PIN". For example, if the user taps the "OK" control 1003, the terminal device may jump to the interface for entering a lock screen password, as shown in FIG. 10c. The user may enter the lock screen password (for example, the lock screen password entered by the user is a first lock screen password) on the interface for entering a lock screen password. The terminal device may verify the lock screen password entered by the user, and disable the function of "Remember PIN" when verification of the lock screen password succeeds.

That the terminal device verifies the lock screen password may be as follows: The asset service module in the terminal device stores the lock screen password of the terminal device, the SIM card check proxy module in the terminal device may send the lock screen password to the asset service module in response to detection of entering the lock screen password by the user, and the asset service module compares the stored lock screen password with the lock screen password from the SIM card check proxy module for verification. If the lock screen password stored in the asset service module is the same as the lock screen password from the SIM card check proxy module, verification of the lock screen password succeeds. If the lock screen password stored in the asset service module is different from the lock screen password from the SIM card check proxy module, verification of the lock screen password fails.

In this embodiment, that the terminal device disables the function of "Remember PIN" may be understood as that the terminal device may not delete the mapping relationship between the first ICCID of the first SIM card and the PIN of the first SIM card, but disable the function of "Remember PIN". In a scenario in which the PIN needs to be verified, the terminal device does not automatically verify the PIN, but displays the interface for entering a PIN, to prompt the user to manually enter the PIN of the first SIM card.

In an embodiment, the user disables SIM card protection, and the terminal device may also disable the function of "Remember PIN". In an embodiment, when the user enables the function of "Remember PIN", and verification of the PIN fails in a scenario of automatically verifying the PIN, the terminal device may also disable the function of "Remember PIN". In this embodiment, that the terminal device disables the function of "Remember PIN" may be understood as that the terminal device deletes the stored mapping relationship between the first ICCID of the first SIM card and the PIN of the first SIM card. In the scenario in which the PIN needs to be verified, instead of automatically verifying the PIN, the terminal device displays the interface for entering a PIN, to prompt the user to manually enter the PIN of the first SIM card.

The following describes the scenario in which verification of the PIN fails in the scenario of automatically verifying the PIN.

In an embodiment, after a first terminal device stores the mapping relationship between the first ICCID of the first SIM card and the PIN of the first SIM card in response to that the user enables the function of "Remember PIN", if the user removes the first SIM card from the first terminal device, inserts the first SIM card into a second terminal device, and changes the PIN of the first SIM card, the first SIM card stores a changed PIN. After the user re-inserts the first SIM card into the first terminal device, the first terminal device may verify the PIN of the first SIM card based on the PIN, stored in the first terminal device, of the first SIM card. Because the PIN stored in the first SIM card is the changed PIN in the second terminal device, automatic verification of the PIN by the first terminal device fails.

Figure 11:
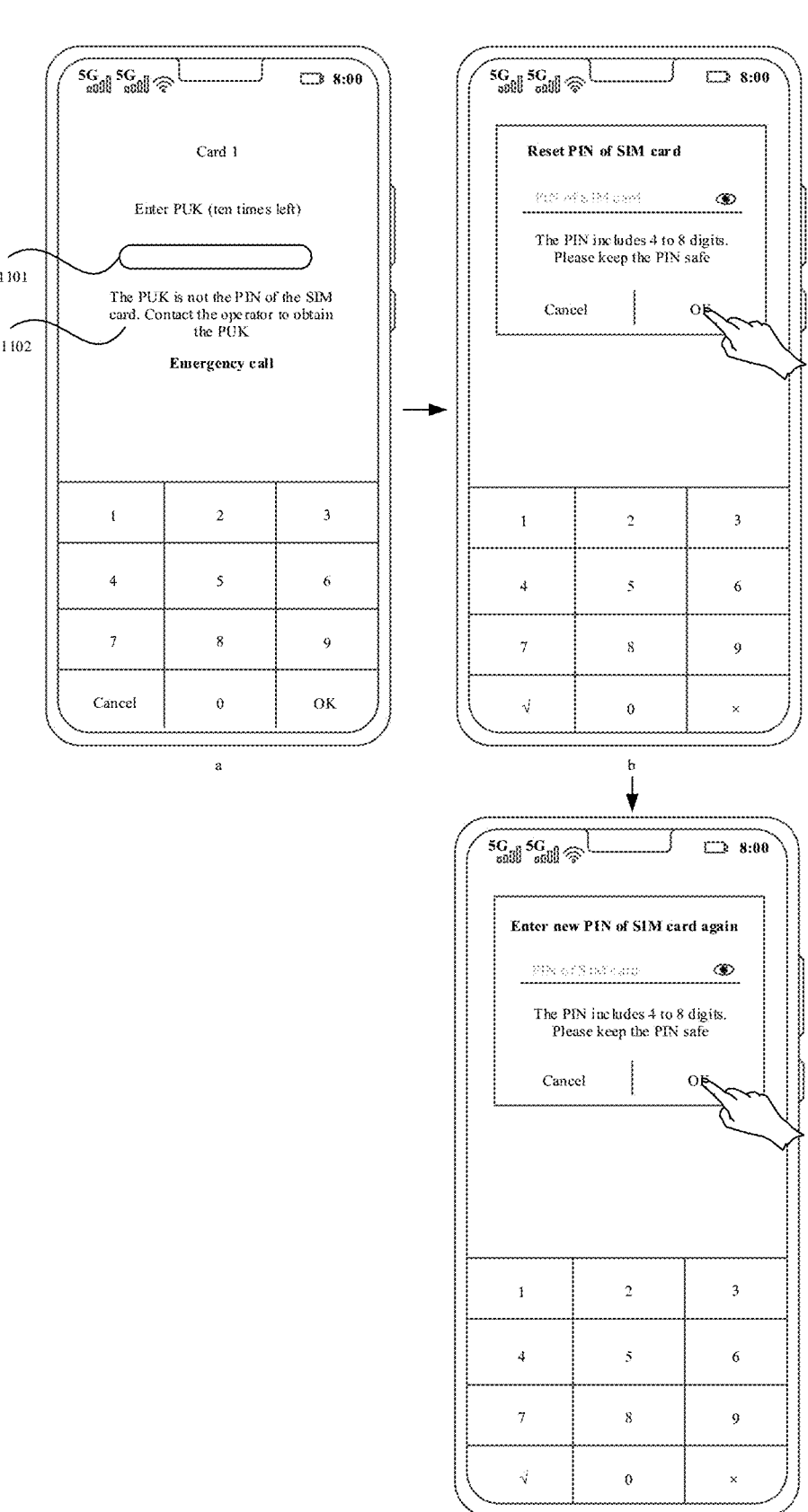
FIG. 11a to FIG. 11c are a schematic diagram of another interface change of a terminal device according to an embodiment of this application.

In an embodiment, if automatic verification of the PIN by the terminal device always fails, the first SIM card is locked, and the terminal device may display an interface for entering a PUK. Refer to FIG. 11a. The interface for entering a PUK may include an identifier of a SIM card for which SIM card protection is enabled, for example, "Card 1", a remaining quantity of PUK entering times, for example, 10 times, a PUK input box 1101, and a description 1102 of entering a PUK. The description 1102 of entering a PUK may include a text description such as "The PUK is not the PIN of the SIM card. Contact the operator to obtain the PUK".

Because the PIN, stored in the terminal device, of the first SIM card is incorrect, automatic verification of the PIN fails. Therefore, after the user contacts the operator to obtain the PUK and enters the correct PUK in the PUK input box 1101, the terminal device may jump to an interface for resetting a PIN, to ensure that automatic verification of the PIN by the terminal device succeeds next time. Refer to FIG. 11b and FIG. 11c. The interface for resetting a PIN is similar to the interface for changing a PIN. For details, refer to related descriptions in the foregoing embodiment. Details are not described herein again.

It should be noted that the terminal device may store a mapping relationship between the first ICCID of the first SIM card and a new PIN of the first SIM card in response to that the user sets the new PIN, to ensure that automatic verification of the PIN can succeed next time.

In an embodiment, after automatic verification of the PIN by the terminal device fails once, the terminal device may disable the function of "Remember PIN", to avoid a case in which the SIM card from being locked due to subsequent automatic verification, and the user further needs to contact the operator to obtain the PUK.

It should be noted that, in an embodiment, if the user does not enable the function of "Remember PIN", in a scenario in which the first SIM card needs to be verified, the user needs to manually enter the PIN of the first SIM card. For example, when the terminal device is restarted, the user needs to manually enter the PIN of the first SIM card. If the PIN entered by the user is incorrect, the terminal device prompts that the PIN is incorrect, and reduces the remaining quantity of PIN verification times by 1. When the user continues to enter an incorrect PIN until the remaining quantity of verification times is 0, the terminal device may jump to the interface for entering a PUK shown in FIG. 11a.

This embodiment is different from the embodiment in which the user enables the function of "Remember PIN". In this embodiment, after the user contacts the operator to obtain the PUK and enters the correct PUK into the PUK input box 1101, the terminal device may display a lock screen interface or a home page of the terminal device. In addition, in response to that the user enters the correct PUK into the PUK input box 1101, the terminal device may display the interface for resetting a PIN shown in FIG. 11b and FIG. 11c, to ensure security of the SIM card.

In conclusion, the user may enable the function of "Remember PIN" on the PIN setting interface and any interface on which a PIN needs to be entered, so that the terminal device can store the PIN of the SIM card. Further, when the PIN of the SIM card needs to be verified, the terminal device can automatically verify the PIN of the SIM card, and the user does not need to manually enter the PIN. Therefore, this improves efficiency, prevents the SIM card from being locked when the user forgets the PIN, and improves user experience.

4. Option for Retrieving a PIN

In an embodiment, after the user enables SIM card protection and enables the function of remembering a PIN, if the user needs to disable SIM card protection, change the PIN, and disable the function of remembering a PIN, the user needs to enter the PIN of the first SIM card. Because the terminal device stores the mapping relationship between the first ICCID of the first SIM card and the PIN of the first SIM card in embodiments of this application, if the user forgets the PIN of the first SIM card, the terminal device can provide the PIN retrieval service for the user.

Figure 12A:
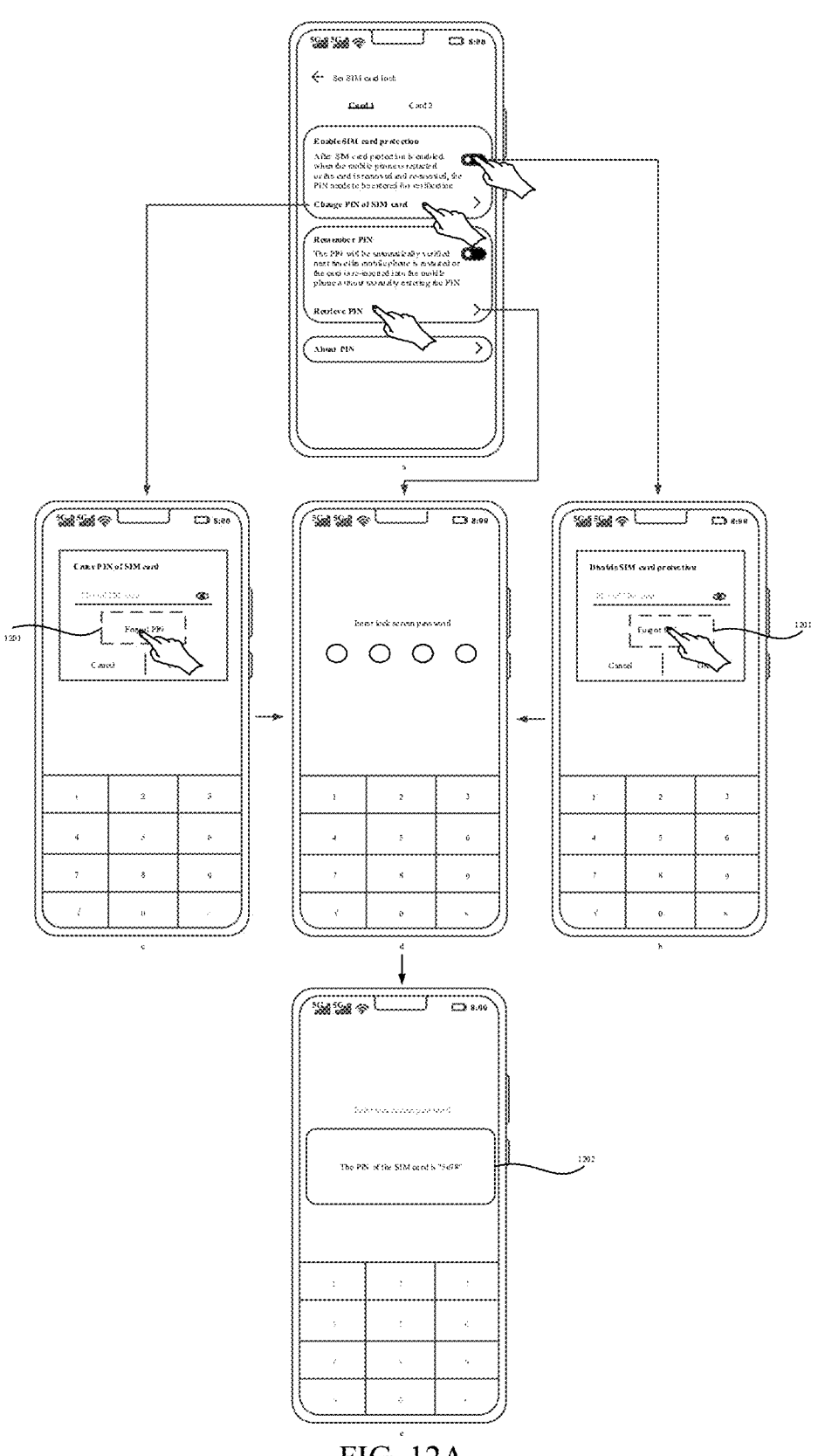
Figure 12B:
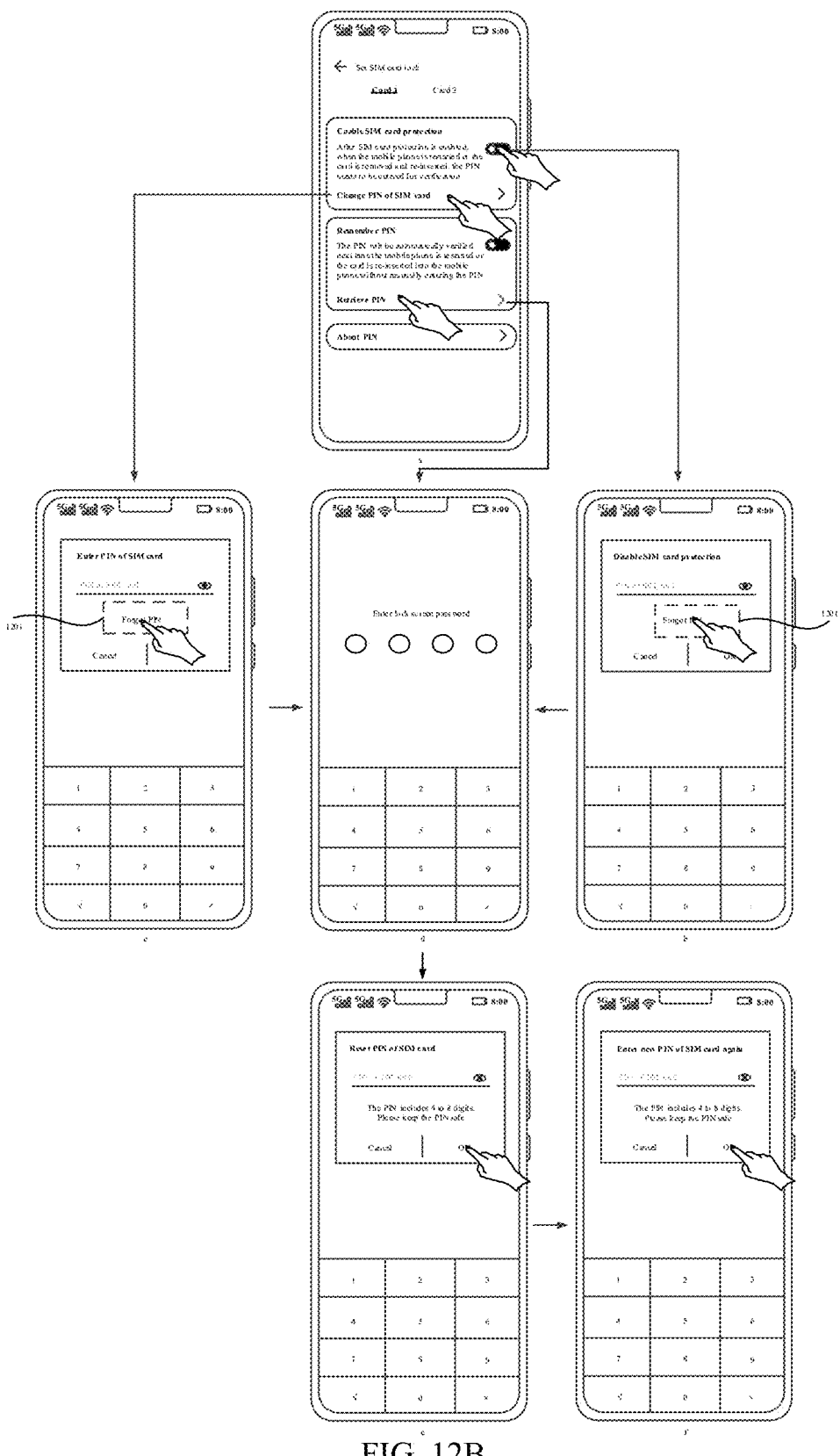

Refer to FIG. 12A-b. In an embodiment, when the user disables SIM card protection, the terminal device may display the interface for entering a PIN. The interface displays a "Forgot password" control 1201. Refer to FIG. 12A-c. In an embodiment, when the user changes the PIN of the first SIM card, the terminal device may display the interface for entering a PIN. The interface also displays the "Forgot password" control 1201. It should be understood that, when the user operates the "Forgot password" control 1201, the terminal device displays an interface shown in FIG. 12A-d. For details, refer to the following related descriptions. It should be understood that FIG. 12A-a may be the same as FIG. 7*d*.

In this embodiment, the terminal device may display the PIN of the first SIM card in response to detecting that the user operates the "Forgot password" control 1201. The terminal device may query, in the stored mapping relationship between the ICCID and the PIN, the PIN, of the first SIM card, to which the first ICCID of the first SIM card is mapped, and further display the PIN of the first SIM card. Optionally, the terminal device may display the PIN of the first SIM card in a pop-up box manner.

In an embodiment, before performing query in the stored mapping relationship between the ICCID and the PIN, the terminal device may read the first ICCID of the first SIM card. Alternatively, when the terminal device registers the first SIM card for accessing a network, the terminal device may read and store the first ICCID of the first SIM card. A manner in which the terminal device reads the first ICCID of the first SIM card is not limited in embodiments of this application.

In an embodiment, when the user operates the "Retrieve PIN" option 36 on the PIN setting interface, the terminal device may display the interface for entering a lock screen password, as shown in FIG. 12A-d. In this embodiment, the terminal device may verify the lock screen password of the terminal device before outputting the PIN of the first SIM card, to improve security of the first SIM card, and prevent another user from randomly obtaining the PIN of the first SIM card. Refer to FIG. 12A-a to FIG. 12A-e. It should be understood that, when the user operates the "Forgot password" control 1201 on the interface shown in FIG. 12A-b, or when the user operates the "Forgot password" control 1201 on the interface shown in FIG. 12A-c, the terminal device may jump to the interface for entering a lock screen password, as shown in FIG. 12A-d.

In this embodiment, the user enters a second lock screen password on the interface shown in FIG. 12A-d, the terminal device may verify the second lock screen password, and the terminal device may display the PIN of the first SIM card in response to that verification of the second lock screen password succeeds. For example, the terminal device may query, in the stored mapping relationship between the ICCID and the PIN, the PIN, of the first SIM card, to which the first ICCID of the first SIM card is mapped, and further display the PIN of the first SIM card. For details, refer to the foregoing related descriptions. Optionally, the terminal device may display the PIN of the first SIM card in a pop-up box manner. As shown in FIG. 12A-e, a pop-up box 1202 displays information such as "The PIN of the SIM card is "5678"", to prompt that the PIN of the first SIM card is "5678".

In the foregoing embodiment, the user may retrieve the PIN of the first SIM card by using the "Forgot password" control 1201 or the "Retrieve PIN" option 36.

In an embodiment, because the user forgets the PIN of the first SIM card, the terminal device may provide a service of resetting the PIN of the first SIM card for the user. This can ensure that the user obtains the PIN of the first SIM card, and further avoid PIN leakage due to direct displaying of the PIN of the first SIM card by the terminal device.

Refer to FIG. 12B-e and FIG. 12B-f. In an embodiment, in response to detecting that the user enters the correct lock screen password, the terminal device may jump to the interface for entering a new PIN, so that the user who forgets the PIN may set the new PIN. It should be understood that, for FIG. 12B-a to FIG. 12B-d, refer to related descriptions of FIG. 11*a* to FIG. 11*d*. For FIG. 12B-e and FIG. 12B-f, refer to FIG. 11*b* and FIG. 11*c*.

In this embodiment, in response to detecting that the user enters the correct lock screen password, the terminal device may query, in the stored mapping relationship between the ICCID and the PIN, the PIN, of the first SIM card, to which the first ICCID of the first SIM card is mapped, and further send the PIN of the first SIM card to the first SIM card, so that the first SIM card verifies the PIN. In response to that verification of the PIN, of the first SIM card, to which the first ICCID is mapped succeeds, the terminal device may send, to the first SIM card, the collected new PIN entered by the user, to achieve an objective of resetting the PIN of the first SIM card. It should be understood that for a manner in which the first SIM card verifies the PIN, refer to related descriptions in the foregoing embodiment.

As described above, when the user forgets the PIN of the first SIM card, the user may reset the PIN of the first SIM card, to avoid PIN leakage due to direct displaying of the PIN of the first SIM card by the terminal device. This can improve security of the PIN.

Figure 13:
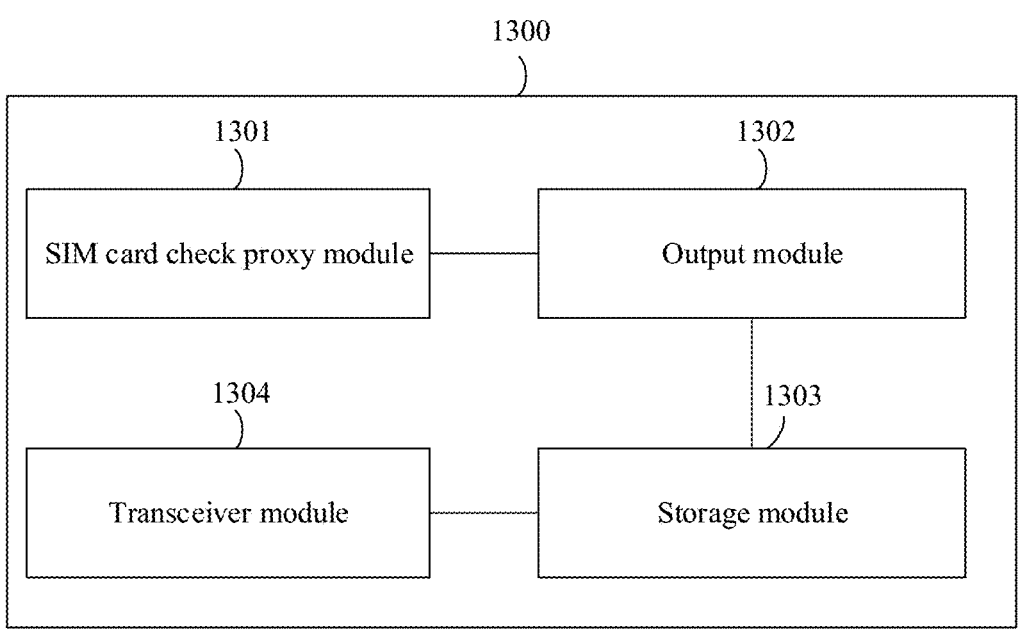
FIG. 13 is a schematic diagram of a structure of a PIN processing apparatus according to an embodiment of this application.

An embodiment of this application provides a PIN processing apparatus. The PIN processing apparatus may be the terminal device in the foregoing embodiments, or a chip in the terminal device. Refer to FIG. 13. The PIN processing apparatus may include: a SIM card check proxy module 1301, an output module 1302, a storage module 1303, and a transceiver module 1304.

The SIM card check proxy module 1301 is configured to: in response to detection of a terminal device being powered on or a first subscriber identification module SIM card being inserted into a powered-on terminal device, detect whether a PIN verification function of the first SIM card in the terminal device is enabled.

The output module 1302 is configured to output first prompt information in response to that the PIN verification function of the first SIM card is not enabled and the terminal device does not output the first prompt information, where the first prompt information is used to guide a user to enable the PIN verification function of the first SIM card.

In a possible implementation, the output module 1302 is specifically configured to output the first prompt information in response to that the PIN verification function of the first SIM card is not enabled, the terminal device does not output the first prompt information, and usage duration of the terminal device is greater than or equal to first preset duration.

In a possible implementation, the SIM card check proxy module 1301 is further configured to: record a first moment in response to detection of a SIM card being inserted into the terminal device for the first time, and use a difference between a current moment and the first moment as the usage duration.

In a possible implementation, the output module 1302 is specifically configured to output the first prompt information in response to that the PIN verification function of the first SIM card is not enabled, the terminal device does not output the first prompt information, the usage duration of the terminal device is greater than or equal to the first preset duration, and the user does not operate a PIN setting interface.

In a possible implementation, the storage module 1303 is configured to: in response to detection of operating the PIN setting interface by the user, store an operation record of operating the PIN setting interface by the user.

The SIM card check proxy module 1301 is further configured to query whether the terminal device stores the operation record.

In a possible implementation, the output module 1302 is specifically configured to output the first prompt information in response to that the PIN verification function of the first SIM card is not enabled, the terminal device does not output the first prompt information, the usage duration of the terminal device is greater than or equal to the first preset duration, the user does not operate the PIN setting interface, and the terminal device enables a preset security function.

In a possible implementation, the preset security function includes at least one of the following: a function of finding a mobile phone and a function of a secure payment center.

In a possible implementation, the transceiver module is configured to send a request command to the first SIM card, where the request command is used to request information about the first SIM card; and receive the information from the first SIM card, where the information indicates a status of the PIN verification function of the first SIM card, and the status includes on or off.

In a possible implementation, the storage module 1303 is configured to: in response to that the terminal device outputs the first prompt information, store an output record of outputting the first prompt information by the terminal device.

The SIM card check proxy module 1301 is further configured to: query whether the terminal device stores the output record; and if no, determine that the terminal device does not output the first prompt information.

In a possible implementation, the output module 1302 is a display module. The output module 1302 is specifically configured to display a notification box including the first prompt information.

In a possible implementation, the output module 1302 is further configured to display a PIN-related interface in response to detection of operating the notification box by the user, where the PIN-related interface includes information about a PIN.

In a possible implementation, the output module 1302 is further configured to display the PIN setting interface in response to that duration of displaying the PIN-related interface reaches second preset duration.

In a possible implementation, the PIN-related interface includes a PIN setting control. The output module 1302 is further configured to display the PIN setting interface in response to that the user operates the PIN setting control.

In a possible implementation, the PIN setting interface includes an option for enabling SIM card protection, and the option for enabling SIM card protection includes a first control. The output module 1302 is further configured to: in response to that the user turns on the first control, display an interface for enabling a PIN verification function, where the interface for enabling a PIN verification function prompts the user to enter the PIN of the first SIM card.

The SIM card check proxy module 1301 is further configured to: in response to that the user enters a first PIN on the interface for enabling a PIN verification function, verify the first PIN based on the PIN of the first SIM card; and enable the PIN verification function of the first SIM card in response to that verification of the first PIN succeeds.

In a possible implementation, the interface for enabling a PIN verification function further includes a PIN prompt description, and the PIN prompt description includes: an initial PIN prompt, an initial PIN change prompt, and a prompt for entering an incorrect PIN.

In a possible implementation, the output module 1302 is further configured to display the PIN setting interface, where the first control on the PIN setting interface is in an on state, the PIN setting interface displays second prompt information, and the second prompt information prompts the user to enable a function of remembering a PIN.

In a possible implementation, the output module 1302 is further configured to: in response to that the user turns off the first control, display a first interface for entering the PIN of the first SIM card.

The SIM card check proxy module 1301 is further configured to: in response to that the user enters a second PIN on the first interface, verify the second PIN based on the PIN of the first SIM card.

The output module 1302 is further configured to output third prompt information in response to that verification of the second PIN succeeds, where the third prompt information prompts whether to adjust the PIN of the first SIM card to an initial PIN.

In a possible implementation, the SIM card check proxy module 1301 is further configured to adjust the PIN of the first SIM card to the initial PIN in response to receiving of an adjustment indication entered by the user, where the adjustment indication indicates that the user agrees to adjust the PIN of the first SIM card to the initial PIN.

In a possible implementation, the PIN setting interface includes an option for changing a PIN of a SIM card. The output module 1302 is further configured to: in response to that the user operates the option for changing a PIN of a SIM card, display a second interface for entering the PIN of the first SIM card.

The SIM card check proxy module 1301 is further configured to: in response to that the user enters a third PIN on the second interface, verify the third PIN based on the PIN of the first SIM card.

The output module 1302 is further configured to: in response to that verification of the third PIN succeeds, display an interface for entering a new PIN, where the interface for entering a new PIN includes a PIN setting mode, and the setting mode includes length information of the PIN.

In a possible implementation, the PIN setting interface includes an option for remembering a PIN, and the option for remembering a PIN includes a second control. The SIM card check proxy module 1301 is further configured to: in response to that the user turns on the second control, detect whether the terminal device sets a lock screen password.

The output module 1302 is further configured to: in response to that the terminal device sets the lock screen password, display a third interface for entering the PIN of the first SIM card.

The SIM card check proxy module 1301 is further configured to: in response to that the user enters a fourth PIN on the third interface, verify the fourth PIN based on the PIN of the first SIM card.

The storage module 1303 is configured to: in response to that verification of the fourth PIN succeeds, correspondingly store a first integrated circuit card identifier ICCID of the first SIM card and the PIN of the first SIM card.

In a possible implementation, the output module 1302 is further configured to: in response to that the terminal device does not set the lock screen password, display an interface for setting a lock screen password.

In a possible implementation, the SIM card check proxy module 1301 is further configured to: in response to detection of the terminal device being powered on or a second SIM card being inserted into the powered-on terminal device, detect whether a PIN verification function of the second SIM card in the terminal device is enabled; and in response to that the PIN verification function of the second SIM card is enabled, detect whether the terminal device enables a function of remembering a PIN.

The output module 1302 is further configured to: if the terminal device does not enable the function of remembering a PIN, display an interface for entering a PIN of the second SIM card.

The SIM card check proxy module 1301 is further configured to: if the terminal device enables the function of remembering a PIN, query, in a stored mapping relationship between an ICCID and a PIN, a PIN to which a second ICCID of the second SIM card is mapped; and verify the PIN to which the second ICCID is mapped.

In a possible implementation, the interface for entering the PIN of the second SIM card includes a description identifier of remembering a PIN. The output module 1302 is further configured to output fourth prompt information in response to that the user operates the description identifier of remembering a PIN, where the fourth prompt information prompts the user to enable the function of remembering a PIN.

In a possible implementation, the interface for entering the PIN of the second SIM card further includes a PIN input box and a prompt box for remembering a PIN. The SIM card check proxy module 1301 is further configured to: in response to that the user enters a fifth PIN in the PIN input box and the user operates the prompt box for remembering a PIN, verify the fifth PIN based on the PIN of the second SIM card; and in response to that verification of the fifth PIN succeeds, detect whether the terminal device sets a lock screen password.

The output module 1302 is further configured to: if the terminal device sets the lock screen password, display an interface for entering a lock screen password; or if the terminal device does not set the lock screen password, display an interface for setting a lock screen password.

In a possible implementation, the output module 1302 is further configured to: in response to that the user turns off the second control, display a fourth interface for entering the PIN of the first SIM card.

The SIM card check proxy module 1301 is further configured to: in response to that the user enters a sixth PIN on the fourth interface, verify the sixth PIN based on a PIN of the first SIM card; and in response to that verification of the sixth PIN succeeds, disable a function of remembering a PIN, and delete a mapping relationship between the first ICCID of the first SIM card and the PIN of the first SIM card.

In a possible implementation, the interface for setting a lock screen password includes an option for disabling a lock screen password. The output module 1302 is further configured to output fifth prompt information in response to detection of operating, by the user, the option for disabling a lock screen password, where the fifth prompt information prompts the terminal device to disable the function of remembering a PIN when the lock screen password is disabled.

In a possible implementation, the output module 1302 is further configured to: in response to detection of an indication, entered by the user, for disabling the lock screen password, display an interface for entering a lock screen password.

The SIM card check proxy module 1301 is further configured to verify a first lock screen password in response to detection of entering, by the user, the first lock screen password on the interface for entering a lock screen password; and in response to that verification of the first lock screen password succeeds, disable the lock screen password and the function of remembering a PIN.

In a possible implementation, the output module 1302 is further configured to: in response to that verification of a PIN entered by the user fails and a quantity of verification failures is greater than or equal to a preset quantity of times, display an interface for entering a PIN unlock key PUK.

The SIM card check proxy module 1301 is further configured to: in response to detection of a PUK entered by the user, verify the PUK entered by the user.

The output module 1302 is further configured to: in response to that verification of the PUK entered by the user succeeds, display an interface for setting the PIN of the first SIM card.

In a possible implementation, the PIN setting interface includes an option for retrieving a PIN, an interface, for entering the PIN of the first SIM card, displayed by the terminal device when the user disables the PIN of the first SIM card is the first interface, an interface, for entering the PIN of the first SIM card, displayed by the terminal device when the user changes the PIN of the first SIM card is the second interface, and the first interface and the second interface each include a forgot password control.

The SIM card check proxy module 1301 is further configured to: in response to detection of operating, by the user, the option for retrieving a PIN or the user operates the forgot password control, query, in a stored mapping relationship between an ICCID and a PIN, a PIN to which a first ICCID of the first SIM card is mapped; and verify the PIN to which the first ICCID is mapped.

The output module 1302 is further configured to: in response to that verification of the PIN to which the first ICCID is mapped succeeds, display an interface for entering a lock screen password.

The SIM card check proxy module 1301 is further configured to verify a second lock screen password in response to that the user enters the second lock screen password.

The output module 1302 is further configured to: in response to that verification of the second lock screen password succeeds, display an interface for setting the PIN of the first SIM card.

The PIN processing apparatus provided in embodiments of this application may perform steps performed by the terminal device in the foregoing embodiments. For a specific principle and technical effect, refer to related descriptions in the foregoing embodiments.

In an embodiment, the PIN processing apparatus provided in embodiments of this application may include a processor (for example, a CPU), a memory, and an output apparatus. The PIN processing apparatus may be the terminal device in the foregoing embodiments, or a chip in the terminal device. The memory may include a high-speed random access memory (random access memory, RAM), and may further include a non-volatile memory (non-volatile memory, NVM), for example, at least one disk memory. The memory may store various instructions, to complete various processing functions and implement the method steps of this application. The output apparatus is configured to output prompt information and receive an indication entered by a user. The prompt information may include first prompt information, second prompt information, third prompt information, fourth prompt information, and fifth prompt information. In an embodiment, the output apparatus may be a display. Optionally, the PIN processing apparatus in this application may further include a power supply, a communication bus, and a communication port. The communication port is configured to implement connection and communication between the PIN processing apparatus and another peripheral. In embodiments of this application, the memory is configured to store computer-executable program code. The program code includes instructions. When the processor executes the instructions, the instructions enable the processor of the PIN processing apparatus to perform the actions in the foregoing method embodiments. An implementation principle and technical effect thereof are similar, and details are not described herein again.

It should be noted that the foregoing modules may be configured as one or more integrated circuits for implementing the foregoing method, such as one or more application-specific integrated circuits (application-specific integrated circuit, ASIC), one or more microprocessors (digital signal processor, DSP), or one or more field programmable gate arrays (field programmable gate array, FPGA). For another example, when one of the foregoing modules is implemented in a form of scheduling program code by a processing element, the processing element may be a general-purpose processor, such as a central processing unit (central processing unit, CPU) or another processor that can invoke the program code. For another example, the modules may be integrated together, and implemented in a form of a system-on-a-chip (system-on-a-chip, SoC).

All or some of the embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state disk (Solid-State Disk, SSD)), or the like.

The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

In addition, it should be understood that in descriptions of this application, terms such as "first" and "second" are merely used for differentiation and description, but should not be understood as an indication or implication of relative importance or an indication or implication of a sequence.

It may be understood that various numbers in embodiments of this application are merely for distinguishing for ease of description, and are not intended to limit the scope of embodiments of this application. In the embodiments of this application, sequence numbers of the processes do not mean execution sequences. The execution sequences of the processes should be determined based on functions and internal logic of the processes, and should not constitute any limitation on the implementation processes in the embodiments of this application.

What is claimed is:

1. A method for verifying a personal identification number (PIN) code, wherein the method is applied to a terminal device and comprises:

receiving a first operation of a user, wherein the first operation instructs the terminal device to enable a function of automatically verifying a PIN code of a first subscriber identity module (SIM) card;

displaying a first interface in response to the first operation when no lock screen password is set for the terminal device, wherein the first interface prompts the user to set a lock screen password;

displaying a second interface in response to completing setting of the lock screen password, wherein the second interface prompts the user to enter a first PIN code;

receiving the first PIN code entered by the user, and storing the first PIN code to complete enabling the function of automatically verifying the PIN code of the first SIM card, wherein the first PIN code is used by the terminal device to automatically verify the first SIM card; and automatically verifying the PIN code of the first SIM card in response to the first SIM card being inserted into the terminal device while the terminal device is powered-on or in response to the terminal device into which the first SIM card is inserted being powered-on, automatically verifying the PIN code of the first SIM card comprising comparing the stored first PIN code to the PIN code of the first SIM card without requiring the user to manually enter the first PIN code.

2. The method according to claim 1, wherein:

the terminal device further stores a second PIN code;

a function of automatically verifying the PIN code of a second SIM card is enabled; and the method further comprises automatically verifying the PIN code of the second SIM card in response to detecting that the second SIM card is inserted, automatically verifying the PIN code of the second SIM card comprising comparing the stored second PIN code to a PIN code of the second SIM card without requiring the user to manually enter the second PIN code.

3. The method according to claim 1, wherein automatically verifying the PIN code of the first SIM card comprises:

automatically verifying the PIN code of the first SIM card in response to the function of automatically verifying the PIN code of the first SIM card being enabled.

4. The method according to claim 1, further comprising:

receiving a second operation of the user, wherein the second operation instructs the terminal device to retrieve the PIN code of the first SIM card; and in response to the second operation, querying, in a stored mapping relationship between an integrated circuit card identifier (ICCID) and a PIN to which a first ICCID of the first SIM card is mapped;

verifying the PIN to which the first ICCID is mapped;

in response to successfully verifying the PIN to which the first ICCID is mapped, displaying an interface for entering the lock screen password;

verifying a second lock screen password in response to the user entering the second lock screen password; and in response to successfully verifying the second lock screen password, displaying an interface for setting the PIN of the first SIM card.

5. The method according to claim 1, wherein the method further comprises:

storing an integrated circuit card identifier (ICCID) of the first SIM card.

6. The method according to claim 5, wherein the ICCID corresponds to the first PIN code.

7. The method according to claim 1, wherein:

the terminal device does not store a PIN code of a second SIM card; and the method further comprises displaying a seventh interface in response to detecting that the second SIM card is inserted, wherein the seventh interface prompts the user to enter the PIN code of the second SIM card.

8. The method according to claim 1, wherein the step of automatically verifying the PIN code of the first SIM card comprises:

querying whether the terminal device comprises the PIN code corresponding to an ICCID of the first SIM card;

sending the PIN code corresponding to the ICCID of the first SIM card to the first SIM card in response to the terminal device comprising a PIN code corresponding to the ICCID of the first SIM card; and receiving a verification result obtained from the first SIM card for the PIN code corresponding to the ICCID of the first SIM card.

9. The method according to claim 1, wherein the method further comprises:

in response to detecting that the terminal device is powered-on or the first SIM card is inserted into a powered-on terminal device, detecting whether a PIN verification function of the first SIM card in the terminal device is enabled; and outputting first prompt information in response to the PIN verification function of the first SIM card not being enabled and the terminal device not outputting the first prompt information, wherein the first prompt information is configured to guide the user to enable the PIN verification function of the first SIM card.

10. The method according to claim 1, wherein the method further comprises:

receiving a third operation of the user instructing the terminal device to turn off a PIN verification function of the first SIM card;

displaying an eighth interface for entering the PIN of the first SIM card in response to the third operation;

in response to the user entering a second PIN on the eighth interface, verifying the second PIN based on the PIN of the first SIM card; and outputting second prompt information in response to successfully verifying the second PIN, wherein the second prompt information prompts whether to adjust the PIN of the first SIM card to an initial PIN.

11. The method according to claim 10, further comprising:

adjusting the PIN of the first SIM card to the initial PIN in response to receiving an adjustment indication entered by the user, wherein the adjustment indication indicates that the user agrees to adjust the PIN of the first SIM card to the initial PIN.

12. A terminal device, comprising:

a processor; and a memory configured to be coupled to the processor with instructions stored thereon, wherein the instructions, when executed by the processor, enable the terminal device to perform:

receiving a first operation of a user, wherein the first operation instructs the terminal device to enable a function of automatically verifying a personal identification number (PIN) code of a first subscriber identity module (SIM) card;

displaying a first interface in response to the first operation when no lock screen password is set for the terminal device, wherein the first interface prompts the user to set a lock screen password;

displaying a second interface in response to completing setting of the lock screen password, wherein the second interface prompts the user to enter a PIN code;

receiving a first PIN code entered by the user;

storing the first PIN code to complete enabling the function of automatically verifying the PIN code of the first SIM card, wherein the first PIN code is used by the terminal device to automatically verify the first SIM card; and automatically verifying the PIN code of the first SIM card in response to the first SIM card being inserted into the terminal device while the terminal device is powered-on or the terminal device into which the first SIM card is inserted is powered-on, automatically verifying the PIN code of the first SIM card comprising comparing the stored first PIN code to the PIN code of the first SIM card without requiring the user to manually enter the first PIN code.

13. The terminal device according to claim 12, wherein the terminal device further stores a second PIN code;

a function of automatically verifying the PIN code of a second SIM card is enabled; and the instructions, when executed by the processor, further enable the terminal device to perform:

automatically verifying the PIN code of the second SIM card in response to detecting that the second SIM card is inserted, automatically verifying the PIN code of the second SIM card comprising comparing the stored second PIN code to a PIN code of the second SIM card without requiring the user to manually enter the second PIN code.

14. The terminal device according to claim 12, wherein automatically verifying the PIN code of the first SIM card comprises:

automatically verifying the PIN code of the first SIM card in response to the function of automatically verifying the PIN code of the first SIM card being enabled.

15. The terminal device according to claim 12, wherein the instructions, when executed by the processor, further enable the terminal device to perform:

receiving a second operation of the user, wherein the second operation instructs the terminal device to retrieve the PIN code of the first SIM card; and in response to the second operation, querying, in a stored mapping relationship between an integrated circuit card identifier (ICCID) and a PIN to which a first ICCID of the first SIM card is mapped;

verifying the PIN to which the first ICCID is mapped;

in response to successfully verifying the PIN to which the first ICCID is mapped, displaying an interface for entering the lock screen password;

verifying a second lock screen password in response to the user entering the second lock screen password; and in response to successfully verifying the second lock screen password, displaying an interface for setting the PIN of the first SIM card.

16. The terminal device according to claim 12, wherein the instructions, when executed by the processor, further enable the terminal device to perform:

storing an integrated circuit card identifier (ICCID) of the first SIM card.

17. The terminal device according to claim 16, wherein the ICCID corresponds to the first PIN code.

18. The terminal device according to claim 12, wherein:

the terminal device does not store a PIN code of a second SIM card; and the instructions, when executed by the processor, further enable the terminal device to perform:

displaying a seventh interface in response to detecting that the second SIM card is inserted, wherein the seventh interface prompts the user to enter the PIN code of the second SIM card.

19. The terminal device according to claim 12, wherein automatically verifying the PIN code of the first SIM card comprises:

querying whether the terminal device comprises the PIN code corresponding to an ICCID of the first SIM card;

sending the PIN code corresponding to the ICCID of the first SIM card to the first SIM card in response to the terminal device comprising a PIN code corresponding to the ICCID of the first SIM card; and receiving a verification result obtained from the first SIM card for the PIN code corresponding to the ICCID of the first SIM card.

20. The terminal device according to claim 12, wherein the instructions, when executed by the processor, further enable the terminal device to perform:

in response to detecting that the terminal device is powered-on or the first SIM card is inserted into a powered-on terminal device, detecting whether a PIN verification function of the first SIM card in the terminal device is enabled; and outputting first prompt information in response to the PIN verification function of the first SIM card not being enabled and the terminal device not outputting the first prompt information, wherein the first prompt information is configured to guide the user to enable the PIN verification function of the first SIM card.

* * * * *